United States Patent
Toda

(10) Patent No.: US 10,454,884 B2
(45) Date of Patent: Oct. 22, 2019

(54) TERMINAL AND MULTICAST ADDRESS DISTRIBUTION SERVER

(71) Applicant: Yoshiyuki Toda, Kanagawa (JP)

(72) Inventor: Yoshiyuki Toda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 359 days.

(21) Appl. No.: 15/216,248

(22) Filed: Jul. 21, 2016

(65) Prior Publication Data

US 2017/0034124 A1  Feb. 2, 2017

(30) Foreign Application Priority Data

Jul. 29, 2015 (JP) ................................. 2015-149412

(51) Int. Cl.
  *H04L 29/12* (2006.01)
  *H04L 12/18* (2006.01)

(52) U.S. Cl.
  CPC ...... *H04L 61/2069* (2013.01); *H04L 12/1886* (2013.01); *H04L 61/609* (2013.01); *H04L 61/2076* (2013.01)

(58) Field of Classification Search
  CPC ............. H04L 12/1886; H04L 61/2069; H04L 61/2076; H04L 61/609
  See application file for complete search history.

(56) References Cited

U.S. PATENT DOCUMENTS

| 2003/0182446 A1 | 9/2003 | Koide et al. |
| 2008/0117453 A1 | 5/2008 | Toda |
| 2008/0155612 A1 | 6/2008 | Ikeda et al. |
| 2011/0209134 A1 | 8/2011 | Toda |
| 2011/0264772 A1* | 10/2011 | Krapf ........................ G06F 8/61 709/220 |
| 2013/0007231 A1* | 1/2013 | Forssell ................ H04L 41/082 709/221 |
| 2013/0054248 A1 | 2/2013 | Ohno et al. |

(Continued)

FOREIGN PATENT DOCUMENTS

| JP | 2003-134161 | 5/2003 |
| JP | 2003-283559 | 10/2003 |

(Continued)

OTHER PUBLICATIONS

Office Action dated Apr. 16, 2019 in Japanese Application No. 2015-149412.

*Primary Examiner* — June Y Sison
(74) *Attorney, Agent, or Firm* — Oblon, McClelland, Maier & Neustadt, L.L.P.

(57) ABSTRACT

A terminal includes a unit configured to send, to a multicast address distribution server, an assignment request including attribute information of the terminal, so as to request assignment of a multicast address enabling identification of a terminal group; and a unit configured to set, in response to the assignment of the multicast address, the multicast address in the terminal and make the terminal to participate in the terminal group corresponding to the multicast address. When a change in the attribute information is detected, the terminal reissues a second assignment request including the attribute information after change, so as to request the multicast address distribution server for a new multicast address and change terminal group for participation according to change in the attribute information.

7 Claims, 11 Drawing Sheets

(56) References Cited

U.S. PATENT DOCUMENTS

| | | | |
|---|---|---|---|
| 2014/0198702 A1* | 7/2014 | Lin | H04W 4/06 370/312 |
| 2014/0256324 A1* | 9/2014 | Mohanty | H04W 4/005 455/436 |
| 2014/0369251 A1* | 12/2014 | Zhang | H04W 4/08 370/312 |

FOREIGN PATENT DOCUMENTS

| | | |
|---|---|---|
| JP | 2008-131134 | 6/2008 |
| JP | 2011-525313 | 9/2011 |
| JP | 4886500 | 12/2011 |
| JP | 2013-505648 | 2/2013 |
| JP | 2014-531146 | 11/2014 |
| JP | 2015-099547 | 5/2015 |

* cited by examiner

FIG.8
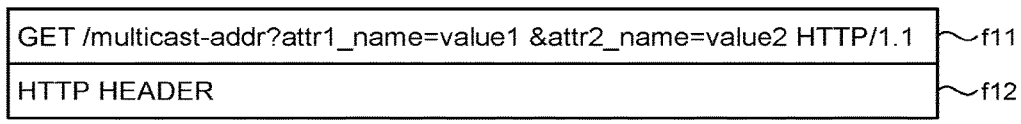
FIG.9
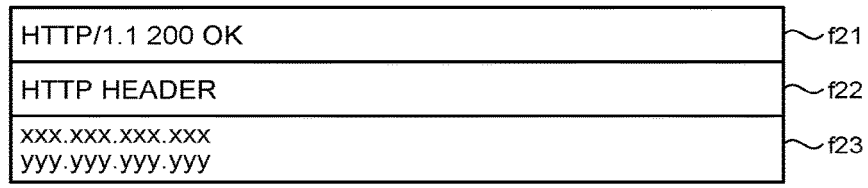
FIG.10
| GROUP IDENTIFIER | ATTRIBUTE INFORMATION | ASSIGNED ADDRESS |
|---|---|---|
| 1 | LOCATION=KANAGAWA PREFECTURE | ff1e::1234:0:1 |
| 2 | LOCATION=OSAKA PREFECTURE | ff1e::1234:0:2 |
| 3 | FRAME VERSION=1.0.1 | ff1e::1234:0:3 |
| 4 | FRAME VERSION=1.0.0 | ff1e::1234:0:4 |
| 5 | POSSESSOR=A COMPANY LIMITED | ff1e::1234:0:5 |
| 6 | POSSESSOR=B COMPANY LIMITED | ff1e::1234:0:5 |
| ... | ... | ... |

TERMINAL AND MULTICAST ADDRESS DISTRIBUTION SERVER

CROSS-REFERENCE TO RELATED APPLICATIONS

The present application claims priority under 35 U.S.C. § 119 to Japanese Patent Application No. 2015-149412, filed on Jul. 29, 2015. The contents of which are incorporated herein by reference in their entirety.

BACKGROUND OF THE INVENTION

1. Field of the Invention

The present invention relates to a terminal and a multicast address distribution server.

2. Description of the Related Art

In the past, a large majority of terminals connected to the Internet were information technology (IT) devices such as personal computers (PCs). However, in recent years, various things in the world other than IT devices have also become equipped with the communication function and have become connectable to the Internet. Such various things that are equipped with the communication function regardless of not being IT devices include wireless tags, components embedded with a sensor device or an actuator device, and IC cards. Thus, the technology by which various things other than IT devices and having the communication function communicate with each other for implementing remote monitoring, remote control, and automatic control is called the Internet of Things (IoT).

As a result of implementing the IoT, an unprecedented enormous number of terminals are connected to the Internet, and there occurs a case in which transmission of packets is done at once from a server to a plurality of terminals belonging to a particular group. As the technology for efficiently transmitting packets to a large number of terminals on a network, the multicast transmission is already known. In the multicast transmission of packets, in order to enable identification of the destination terminal group, it is necessary to set a multicast address in each terminal in the group. In the conventional technology, either a multicast address is directly set in each terminal; or a correspondence table of terminal identifiers and multicast addresses is managed on the server side, and a multicast address is assigned to each terminal according to the identifier of that terminal.

In Japanese Unexamined Patent Application Publication No. 2003-134161, a configuration is disclosed in which, with the aim of performing efficient concurrent transmission of packets to a terminal group satisfying certain conditions, an address delivery server is disposed in a network system for the purpose of performing the following operations. The address delivery serer receives, from the source terminal which is attempting to perform concurrent transmission of packets, a search condition used for searching for the destination terminal group. In response, based on the stored information related to each terminal disposed in the network, the address delivery server searches for the terminal group that matches with the search condition and generates a multicast address to be assigned to the retrieved terminal group. Lastly, the address delivery server notifies the source terminal and the destination terminal group about the generated multicast address.

In Japanese Patent No. 4886500, with the aim of eliminating the need to set a multicast address for an IP broadcast terminal, the invention is disclosed as described below. In the invention disclosed in Japanese Patent No. 4886500, IP broadcast terminals, which receive IP broadcast delivered using multicast, are disposed along with a multicast group managing device. Moreover, the multicast group managing device holds correspondence information containing the correspondence relationship between IP broadcast channel identifiers and multicast group identifiers. An IP broadcast terminal sends a query message including the IP broadcast channel identifier to the multicast group managing device. In response to the query message, the multicast group managing device decides on the multicast group identifier corresponding to the IP broadcast channel, and notifies the IP broadcast terminal about the multicast group identifier.

Besides, according to Japanese Patent No. 4886500, in a query message to be sent to the multicast group managing device, an IP broadcast terminal can include not only the IP broadcast channel but also area information related to the geographical area indicating the location of that IP broadcast terminal. In this case, the multicast group managing device can decide on the multicast group identifier by taking into account the correspondence relationship between the IP broadcast channel identifiers and the multicast group identifiers as well as by taking into account the area information. As a result, in the invention disclosed in Japanese Patent No. 4886500, a multicast group confined to a particular geographical area can be set for the IP broadcast terminal.

However, in the conventional technology including the inventions disclosed in J Japanese Unexamined Patent Application Publication No. 2003-134161 and Japanese Patent No. 4886500, it is difficult to assign a plurality of groups to each terminal. Hence, in the conventional technology, for example, the following issue arises in the case in which, for each terminal installation area, the terminal group to which the terminals belong is defined and each terminal is assigned with the terminal group to which the terminal should belong. That is, when the installation area of a particular terminal is changed, it is difficult in the conventional technology to dynamically change the terminal group to which the particular terminal belongs. Moreover, as the attribute information of terminals, it is possible to think of a variety of attribute information other than the terminal installation area. However, in the conventional technology, when the attribute information of a terminal is changed, the following issue arises. That is, in the conventional technology, dynamically resetting a new multicast address in the terminal or dynamically changing the multicast group to which the terminal belongs cannot be done in a manner adapted to the change in the attribute information.

SUMMARY OF THE INVENTION

According to one aspect of the present invention, a terminal includes a unit configured to send, to a multicast address distribution server, an assignment request including attribute information of the terminal, so as to request assignment of a multicast address enabling identification of a terminal group; and a unit configured to set, in response to the assignment of the multicast address, the multicast address in the terminal and make the terminal to participate in the terminal group corresponding to the multicast address. When a change in the attribute information is detected, the terminal reissues a second assignment request including the attribute information after change, so as to request the multicast address distribution server for a new multicast address and change terminal group for participation according to change in the attribute information.

BRIEF DESCRIPTION OF THE DRAWINGS

FIG. 8 is a diagram illustrating a field configuration of an assignment request packet that is sent for requesting assignment of a multicast address according to the embodiment;

FIG. 9 is a diagram illustrating a field configuration of a response packet that is sent as a response to a multicast address assignment request packet according to the embodiment;

FIG. 10 is a diagram illustrating a correspondence table that is managed in the multicast address distribution server according to the embodiment for managing the correspondence relationship between terminal attribute information and multicast addresses;

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
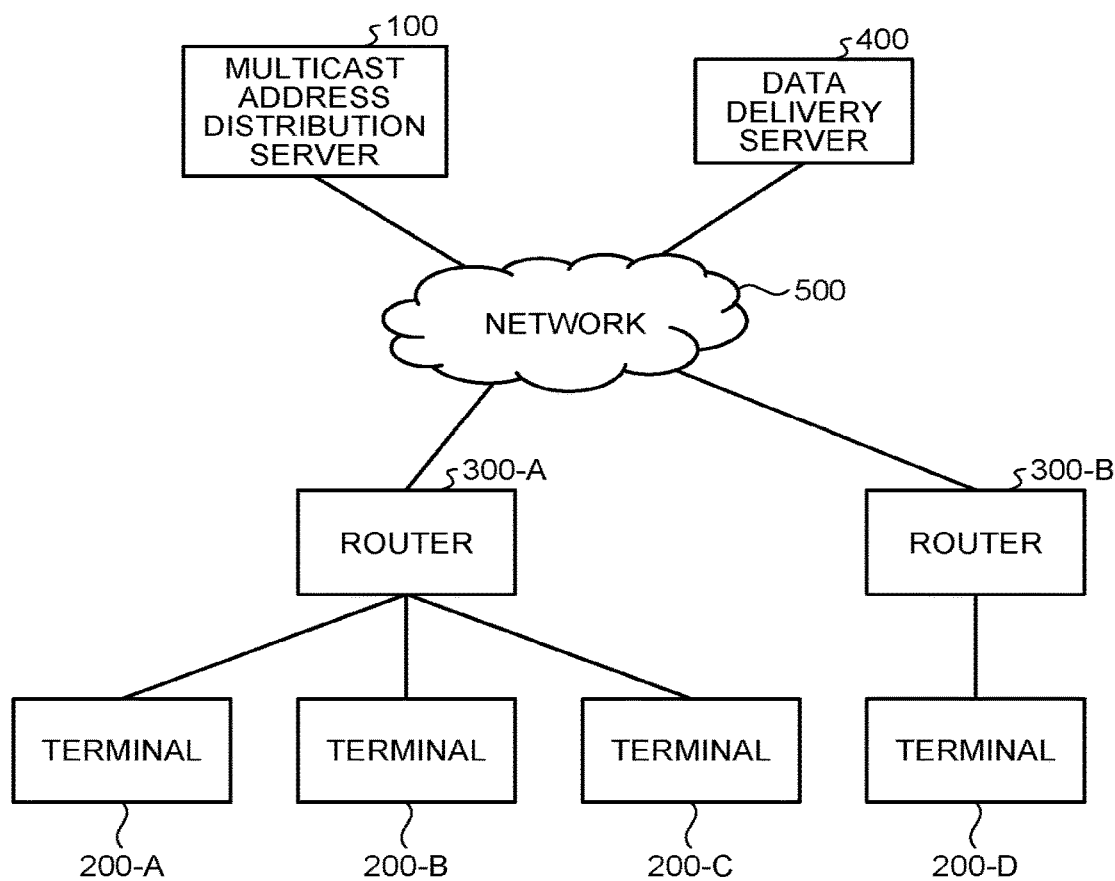
FIG. 1 is a configuration diagram of an entire data delivery network according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An object of an embodiment is to provide a terminal that, when the attribute information thereof is changed, is capable of dynamically changing the multicast group to which the terminal belongs, in a manner adapted to the change in the attribute information.

An embodiment relates to a data delivery system in which each terminal that is assigned with a multicast address by a multicast address distribution server participates in the multicast group that is identified by the assigned multicast address, and thus becomes able to receive delivery data that is delivered using multicast from a data delivery server. The data delivery system according to the embodiment includes a mechanism to implement the following. That is, each terminal which is attempting to receive multicast delivery data is associated to two or more multicast groups, and is capable of changing the multicast group for participation according to the situation.

Figure 11:
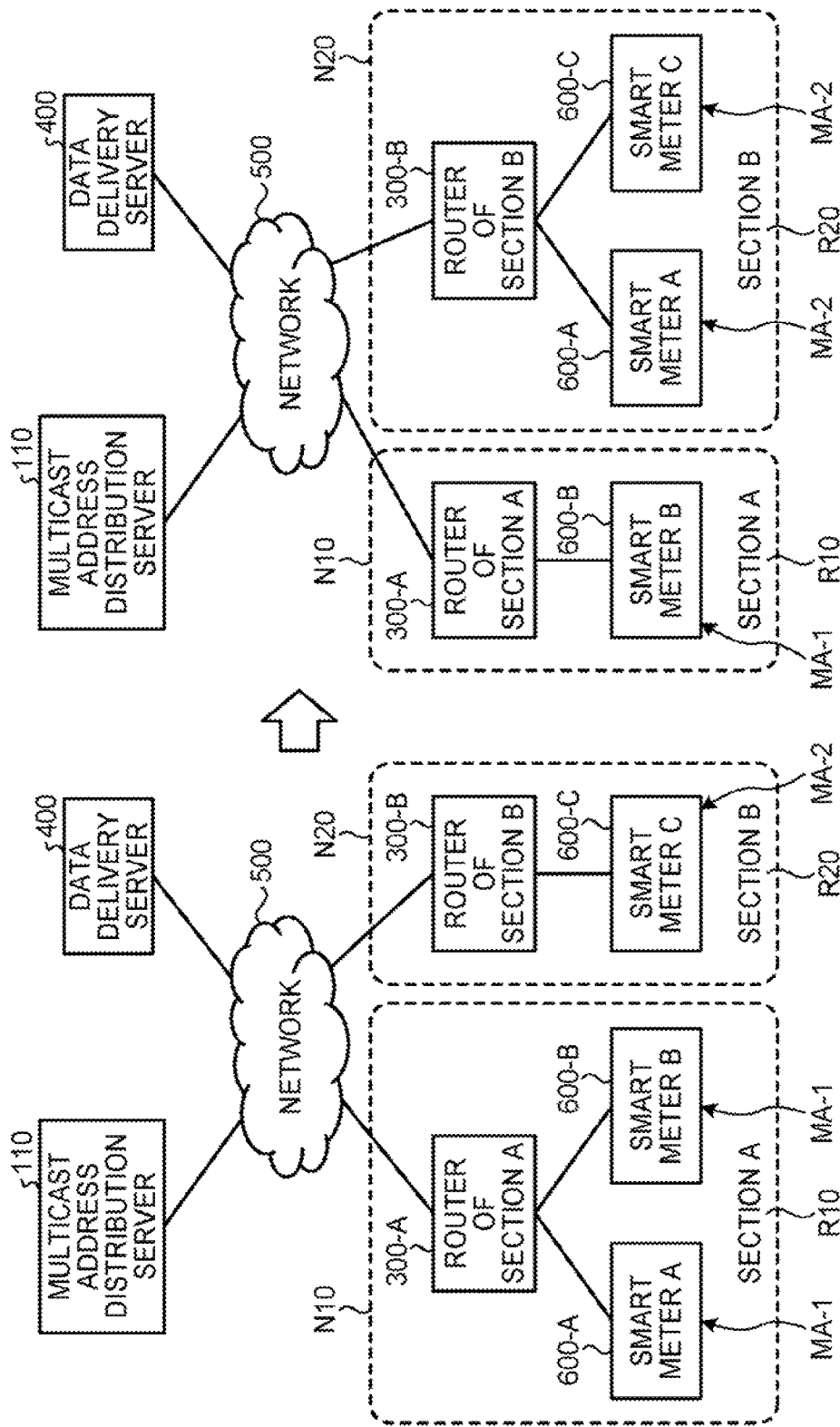
FIG. 11 is a system configuration diagram for explaining a sequence of operations performed according to the embodiment in the case in which the installation area of a smart meter is changed.
Figure 12:
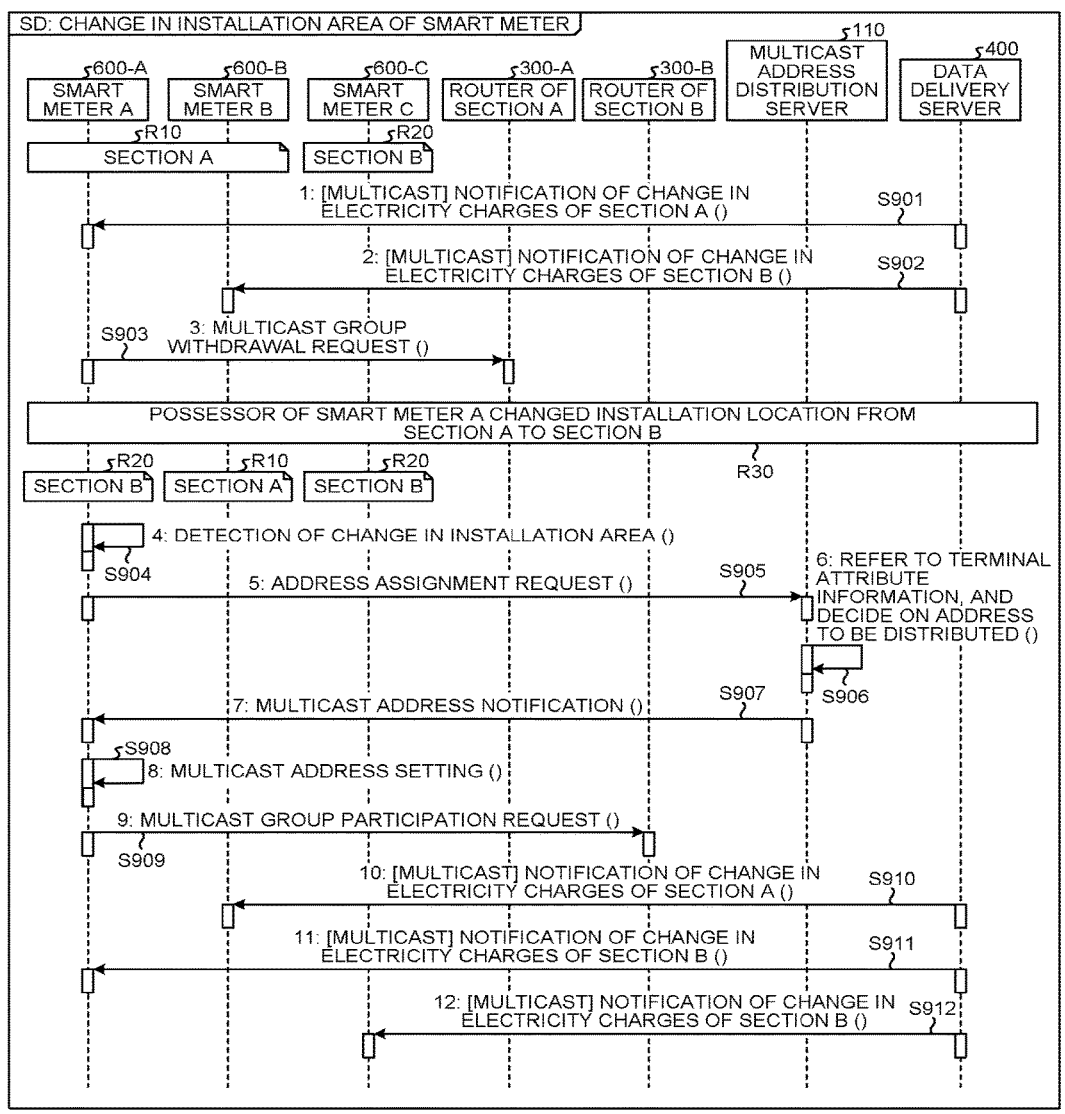
FIG. 12 is a sequence diagram for explaining a sequence of operations performed according to the embodiment in the case in which the installation area of a smart meter is changed.

In the following explanation of the present embodiment, firstly, explained with reference to FIGS. 1 to 4 is a configuration of an entire network of a multicast-type data delivery system according to the embodiment and a configuration of a server device and a terminal connected to the network. Then, explained with reference to FIGS. 5 to 8 is the sequence of operations for assigning a multicast address to a terminal and making the terminal to participate in a particular multicast group, and the data structure of messages communicated during those operations. Subsequently, explained with reference to FIGS. 9 and 10 is a sequence of operations performed according to a first practical example of the present embodiment; and explained with reference to FIGS. 11 and 12 is a sequence of operations performed according to a second practical example of the present embodiment.

Explained below with reference to FIG. 1 is a configuration of an entire network of a multicast-type data delivery system according to the present embodiment. The multicast-type delivery system according to the present embodiment includes a multicast address distribution server 100, terminals 200-A to 200-D, routers 300-A and 300-B, a data delivery server 400, and a network 500. In the present embodiment, instead of having the routers 300-A and 300-B, it is possible to have three or more routers connected; and the routers are collectively referred to as the routers 300. In the present embodiment, instead of having the terminals 200-A to 200-D, it is possible to have five or more terminals connected; and the terminals are collectively referred to as terminals 200. The multicast address distribution server 100 is connected to one or more terminals 200 via the network 500 and one or more routers 300. The data delivery server 400 too is connected to one or more terminals 200 via the network 500 and one or more routers 300.

When an assignment request for requesting assignment of a multicast address is received from the terminal 200, the multicast address distribution server 100 assigns a multicast address to the terminal 200 and delivers the assigned multicast address to the terminal 200. The multicast address assigned individually to each terminal 200 by the multicast address distribution server 100 enables identification of the multicast group to which the terminal 200 should belong. Herein, a multicast group implies a terminal group representing a group of terminals to which identical multicast data is delivered using multicast from the same data delivery source. Moreover, the network address (such as the IP address) representing the data transmission source is the network address (such as the IP address) of the server serving as the data delivery source.

For example, assume that the terminal 200-A, which is attempting to receive the multicast data to be delivered to a terminal group G1, issues a multicast address assignment request to the multicast address distribution server 100. In this case, upon receiving the assignment request, the multicast address distribution server 100 assigns a multicast address ad-1, which enables identification of the terminal group G1 as the multicast delivery destination, to the terminal 200-A and sends the multicast address ad-1 back to the terminal 200-A. As another example, assume that the terminal 200-D, which is attempting to receive the multicast data to be delivered to a terminal group G2 different than the terminal group G1, issues a multicast address assignment request to the multicast address distribution server 100. In this case, upon receiving the assignment request, the multicast address distribution server 100 assigns a multicast address ad-2, which enables identification of the terminal group G2 as the multicast delivery destination, to the terminal 200-D and sends the multicast address ad-2 back to the terminal 200-D.

The data delivery server 400 is a server for performing multicast delivery of multicast data to a group of terminals 200 specified as the destinations according to the multicast address. The data delivery server 400 manages one or more multicast addresses, each of which corresponds to one of one or more multicast groups. The data delivery server 400 sets the network address thereof as the source network address, generates a sequence of packets while treating a managed multicast address as the destination network address, puts multicast data in the sequence of packets, and delivers the packets. As a result, the data delivery server 400 delivers a sequence of packets, in which the multicast data is put, to the terminals belonging to the terminal group identified by the multicast address managed by the data delivery server 400.

The terminal 200 sends a multicast address assignment request to the multicast address distribution server 100 with the aim of newly belonging to a particular terminal group and receiving multicast data that is delivered using multicast to the particular terminal group as the destination. Then, in response to the assignment request, the terminal 200 receives, from the multicast address distribution server 100, the multicast address that enables identification of the particular terminal group, to which the terminal 200 should belong, as the multicast delivery destination.

For example, assume that the terminal 200-A, which is attempting to receive multicast data, issues a multicast address assignment request to the multicast address distribution server 100. In this case, upon receiving the assignment request, the multicast address distribution server 100 assigns the multicast address ad-1, which enables identification of the terminal group G1 as the multicast delivery destination, to the terminal 200-A. Then, from the multicast address distribution server 100, the terminal 200-A receives the multicast address ad-1 and sets it therein.

As another example, assume that the terminal 200-D, which is attempting to receive multicast data, issues a multicast address assignment request to the multicast address distribution server 100. In this case, upon receiving the assignment request, the multicast address distribution server 100 assigns the multicast address ad-2, which enables identification of the terminal group G2 as the multicast delivery destination, to the terminal 200-D. Then, from the multicast address distribution server 100, the terminal 200-D receives the multicast address ad-2 and sets it therein.

After the terminal 200 receives and sets therein the multicast address assigned by the multicast address distribution server 100, the terminal 200 newly belongs to the terminal group identified to be the multicast delivery destination by the concerned multicast address. Moreover, after the terminal 200 receives and sets therein the assigned multicast address, the terminal 200 can receive the multicast data delivered using multicast and addressed to the multicast address. Meanwhile, regarding a specific mechanism and sequence of operations implemented in the router 300 and the network 500 for the purpose of making individual terminals 200 to newly belong to any of the existing terminal groups, the explanation is given later with reference to FIG. 5.

Figure 2:
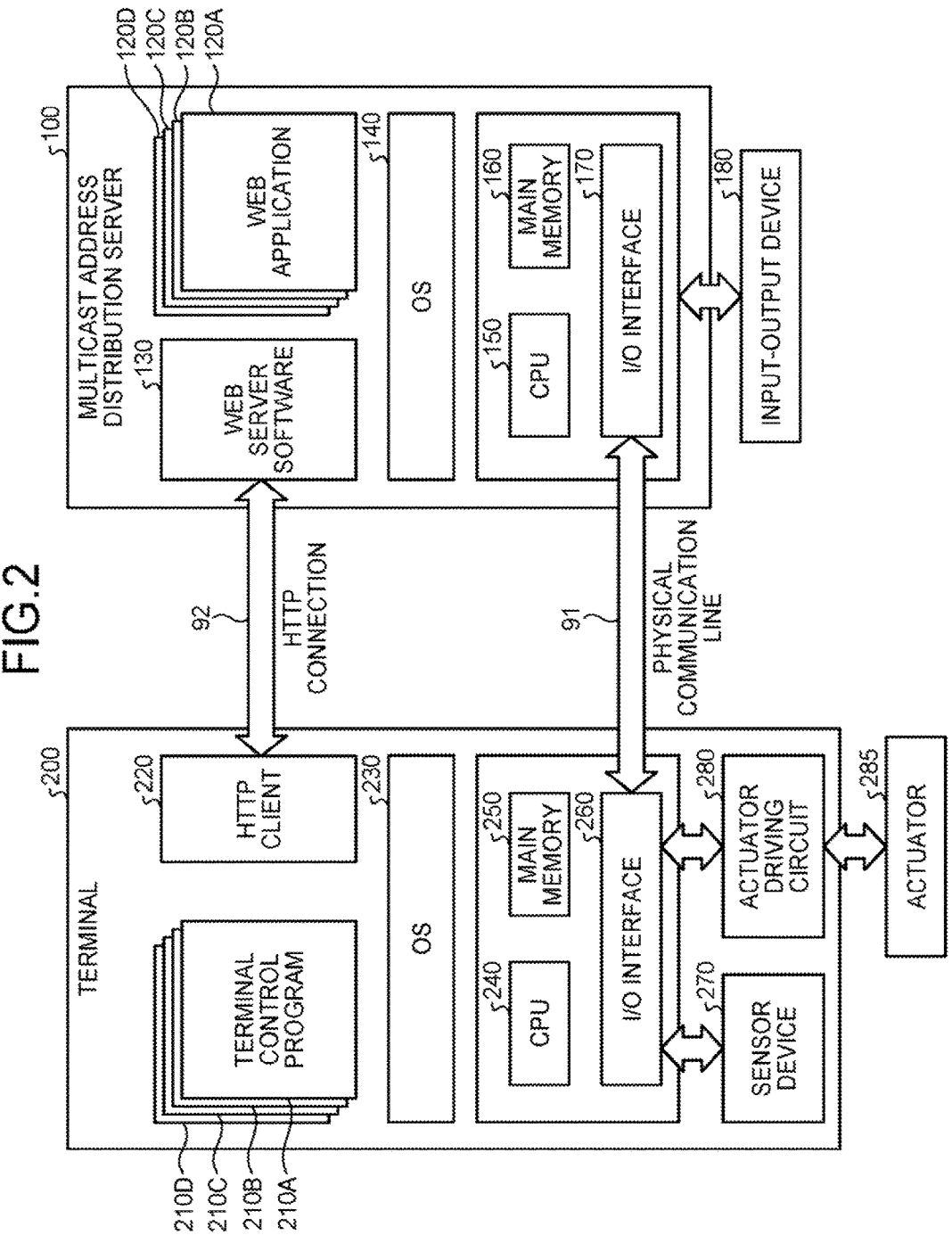
FIG. 2 is a device configuration diagram of a terminal and a multicast address distribution server according to the embodiment.

Explained below with reference to FIG. 2 is a device configuration of the multicast address distribution server 100 and the terminal 200. The multicast address distribution server 100 can be configured as a server computer that includes a central processing unit (CPU) 150, a main memory 160, an I/O interface 170, and an input-output device (such as a mouse, a keyboard, or a display) 180. In the multicast address distribution server 100, the CPU 150 executes an operating system (OS) 140 that is resident in the main memory 160. In the OS 140, a plurality of web applications 120A to 120D and web server software 130 are running. In the following explanation, the web applications 120A to 120D are collectively referred to as web applications 120. Moreover, the web applications 120A to 120D can perform two-way communication of data with the web server software 130 using the inter-process communication function and the inter-thread communication function provided by the OS 140. In an identical manner, the web applications 120 can perform two-way communication of data among themselves using the inter-process communication function and the inter-thread communication function provided by the OS 140.

As one example, the terminal 200 is a terminal device which includes a CPU 240, a main memory 250, a sensor device 270, and an actuator driving circuit 280 to drive an actuator 285; and in which the sensor device 270 and the actuator driving device 280 can communicate data with the CPU 240 and the main memory 250 via an I/O interface 260. In the terminal 200, the CPU 240 executes an OS 230 that is resident in the main memory 250. In the OS 230, a plurality of terminal control programs 210A to 210D and an HTTP client 220 (HTTP stands for HyperText Transfer Protocol) are running. In the following explanation, the terminal control programs 210A to 210D are collectively referred to as terminal control programs 210. Moreover, the terminal control programs 210A to 210D can perform two-way communication of data with the HTTP client 220 using the inter-process communication function and the inter-thread communication function provided by the OS 230. In an identical manner, the terminal control programs 210 can perform two-way communication of data among themselves using the inter-process communication function and the inter-thread communication function provided by the OS 230. Furthermore, in an alternative example, the terminal 200 can be configured as a mobile information terminal that includes a CPU, a main memory, an I/O interface, and an input-output device (such as a touch-sensitive panel or a liquid crystal display).

The I/O interface 170 of the multicast address distribution server 100 as well as the I/O interface 260 of the terminal 200 includes a network interface (not illustrated) for implementing the communication function at the physical level. The I/O interface 170 of the multicast address distribution server 100 and the I/O interface 260 of the terminal 200 can perform communication with each other at the physical layer level and the data link layer level via a physical communication line 91 using the communication function of the network interface. When the terminal control programs 210A to 210D in the terminal 200 send messages to the web applications 120A to 120D in the multicast address distribution server 100, a sequence of communication control operations described below are performed between the terminal 200 and the multicast address distribution server 100 via the physical communication line 91 using the communication function at the physical layer level and the data link layer level.

Firstly, the terminal control program 210 issues a communication session start request to the HTTP client 220. Upon receiving the request, the HTTP client 220 issues an establishment request to the web server software 130 in the multicast address distribution server 100 for establishing an HTTP connection 92. Upon receiving the establishment request for establishing the HTTP connection 92, the web server software 130 in the multicast address distribution server 100 establishes the HTTP connection 92 with the HTTP client 220 in the terminal 200. After the HTTP connection 92 is established; the terminal control program 210 sends messages to the web applications 120A to 120D in the multicast address distribution server 100 via the HTTP connection 92 established between the HTTP client 220 and the web server software 130 and can also receive a response message from the web applications 120A to 120D.

Figure 3:
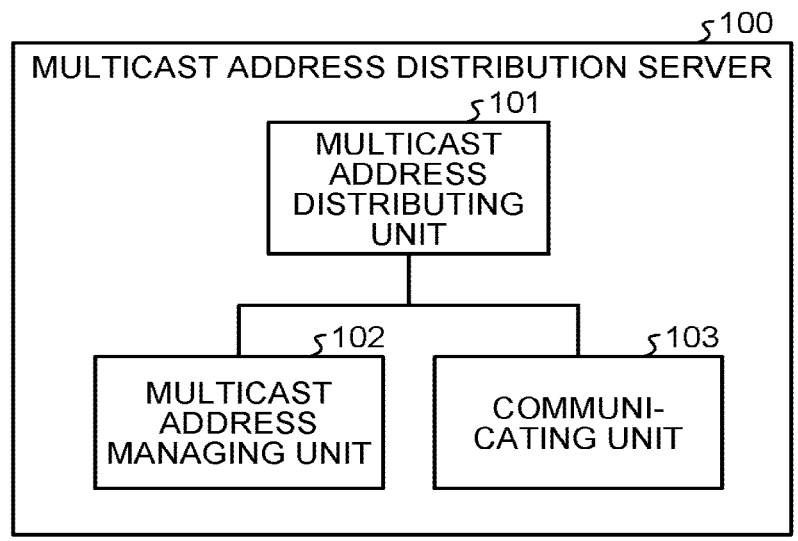
FIG. 3 is a functional module configuration diagram of the multicast address distribution server according to the embodiment.

Explained below with reference to FIG. 3 is a functional module configuration of the multicast address distribution server 100. The multicast address distribution server 100 includes a multicast address distributing unit 101, a multicast address managing unit 102, and a communicating unit 103. The multicast address distributing unit 101, the multicast address managing unit 102, and the communicating unit 103 can be implemented as the web applications 120 that are run in the OS 140 by the CPU 150 in the multicast address distribution server 100. The multicast address distributing unit 101, the multicast address managing unit 102, and the communicating unit 103 that are implemented as the web applications 120 in the OS 140 by the CPU 150 can perform two-way communication of data among themselves using the inter-process communication function and the inter-thread communication function provided by the OS 140.

The communicating unit 103 is a functional module for sending packets to and receiving packets from one or more terminals 200 via the network 500 and one or more routers 300. The packets sent and received by the communicating unit 103 include assignment request packets in which the terminals 200 have issued assignment requests to the multicast address distribution server 100 for requesting assignment of multicast addresses. Moreover, the packets sent and received by the communicating unit 103 include response packets in which multicast addresses are sent back to the terminals 200 as a response to the assignment requests.

The multicast address distributing unit 101 is a functional module for performing overall control of the operation of assigning multicast addresses to the individual terminals 200 according to the respective attributes. More particularly, upon receiving a notification from the communicating unit 103 that an assignment request packet including a multicast address assignment request is received from the terminal 200, the multicast address distributing unit 101 receives the assignment request from the communicating unit 103. The multicast address assignment request received from the terminal 200 includes attribute information of that terminal 200. The attribute information of the terminal 200 is information about the present status of the terminal 200 and about terminal attributes reflecting device setting details. With this, in the multicast address distribution server 100, a unit to receive an assignment request from the terminal 200 for requesting assignment of a multicast address is established.

Then, the multicast address distributing unit 101 instructs the multicast address managing unit 102 to obtain the multicast address corresponding to the attribute information of the terminal 200 as included in the multicast address assignment request received from the terminal 200. The multicast address that is obtained by the multicast address managing unit 102 corresponding to the attribute information of the terminal 200 is the multicast address that should be assigned to the terminal 200 in response to the assignment request from the terminal 200. Subsequently, the multicast address distributing unit 101 receives the multicast address, which should be assigned to the terminal 200, from the multicast address managing unit 102 and instructs the communicating unit 103 to send the multicast address back to the terminal 200. With this, in the multicast address distribution server 100, a unit to notify the terminal 200 about the decided multicast address is established.

The multicast address managing unit 102 holds the correspondence relationship between the attribute information and the multicast addresses of the terminals 200 in the form of a table, as well as holds the status of assignment of multicast addresses to the terminals 200. With this, in the multicast address distribution server 100, a unit to hold the correspondence relationship between the attribute information of the terminals 200 and the multicast addresses is established. In addition, upon receiving an instruction from the multicast address distributing unit 101, the multicast address managing unit 102 performs the following operations. That is, the multicast address managing unit 102 searches the table, which contains the correspondence relationship between the attribute information and the multicast addresses of the terminals 200, using the attribute information, which is newly sent regarding a particular terminal 200x by the multicast address distributing unit 101, as the search key. If a multicast address corresponding to the search key is obtained as a result of the search, then the multicast address managing unit 102 assigns a null address, which is equivalent to the unassigned portion of the multicast address, to the terminal 200x. With this, in the multicast address distribution server 100, a unit to decide on the multicast address, which is to be distributed to the terminal 200x, based on the attribute information of the terminal 200x as received from the terminal 200x is established.

Figure 4:
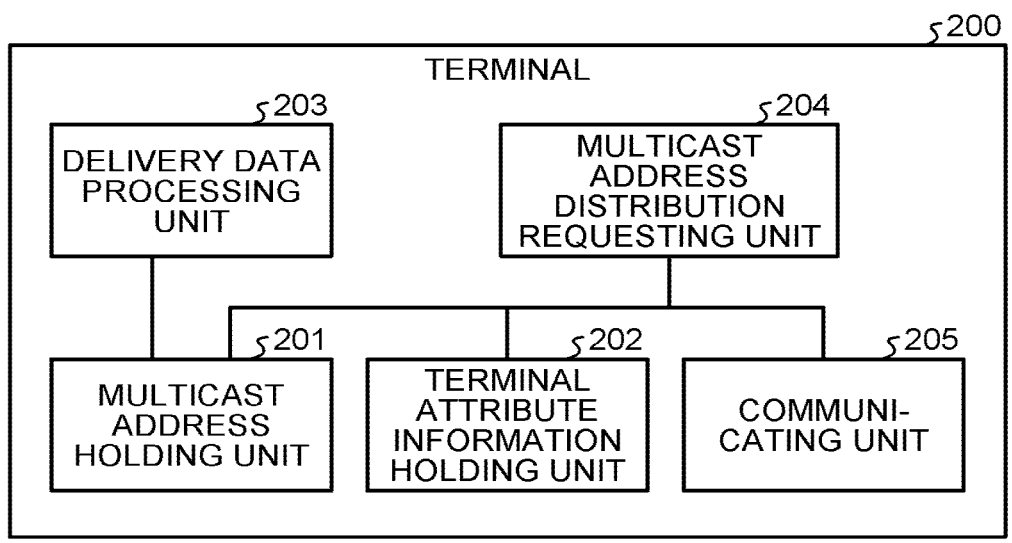
FIG. 4 is a functional module configuration diagram of the terminal according to the embodiment.

Explained below with reference to FIG. 4 is a functional module configuration of the terminal 200. Herein, the terminal 200 includes a multicast address holding unit 201, a terminal attribute information holding unit 202, a delivery data processing unit 203, a multicast address distribution requesting unit 204, and a communicating unit 205. The multicast address holding unit 201, the terminal attribute information holding unit 202, the delivery data processing unit 203, the multicast address distribution requesting unit 204, and the communicating unit 205 can be implemented as the terminal control programs 210 executed in the OS 230 by the CPU 240. The multicast address holding unit 201, the terminal attribute information holding unit 202, the delivery data processing unit 203, the multicast address distribution requesting unit 204, and the communicating unit 205 that are implemented as the terminal control programs 210 in the OS 230 can perform two-way communication of data among themselves using the inter-process communication function and the inter-thread communication function provided by the OS 230 in the terminal 200.

The communicating unit 205 is a functional module for sending packets to and receiving packets from the multicast address distribution server 100 via one or more routers 300 and the network 500. The packets sent and received by the communicating unit 205 include an assignment request packet in which the terminal 200 has issued an assignment request to the multicast address distribution server 100 for requesting assignment of a multicast address. Moreover, the packets sent and received by the communicating unit 205 include a response packet in which a multicast address is sent back to the terminal 200 from the multicast address distribution server 100 as a response to the assignment request.

The multicast address holding unit 201 holds the multicast address received from the multicast address distribution server 100. The terminal attribute information holding unit 202 holds attribute information such as the position information and the firmware version of the terminal 200. The multicast address distribution requesting unit 204 includes the attribute information of the terminal 200 in a multicast address assignment request, and then instructs the communicating unit 205 to send the assignment request to the multicast address distribution server 100. With this, in the terminal 200, a unit to send, to the multicast address distribution server 100, an assignment request including the attribute information of the terminal 200 from the terminal 200 to request assignment of a multicast address enabling identification of the terminal group is established. Moreover, the multicast address distribution requesting unit 204 receives a multicast address from the multicast address distribution server 100 and instructs the multicast address holding unit 201 to set the received multicast address as the multicast address for reception in the terminal 200. With this, in the terminal 200, a unit to set, in response to the assignment of the multicast address, a multicast address in the terminal 200 and make the terminal 200 to participate in the terminal group identified by the multicast address is established. The delivery data processing unit 203 processes the data that is delivered using multicast to the multicast address from the data delivery server 400.

In order to issue a multicast address assignment request from the terminal 200 to the multicast address distribution server 100, a message including an assignment request is transmitted from the terminal 200 to the multicast address distribution server 100 in the following manner. That is, the communicating unit 205 (FIG. 4) receives the message including the assignment request from the multicast address distribution requesting unit 204 (FIG. 4), and sends the message to the HTTP client 220 (FIG. 2). Then, the HTTP client 220 sends the message as an HTTP request message to the web server software 130 (FIG. 2) in the multicast address distribution server 100 via the HTTP connection 92 (FIG. 2) that is established with the web server software 130 (FIG. 2). Upon receiving the message, the web server software 130 sends the message to the communicating unit 103 (FIG. 3), and the communicating unit 103 sends the message to the multicast address distributing unit 101 (FIG. 3).

Conversely, as a response to the message, a response message for letting the terminal 200 receive a multicast address from the multicast address distribution server 100 is transmitted in the following manner. That is, the communicating unit 103 (FIG. 3) receives the response message including the multicast address from the multicast address distributing unit 101 (FIG. 3), and sends the response message to the web server software 130 (FIG. 2). Then, the web server software 130 sends the response message as an HTTP response message to the HTTP client 220 (FIG. 2) in the terminal 200 via the HTTP connection 92 (FIG. 2) that is established with the HTTP client 220 (FIG. 2). Upon receiving the response message, the HTTP client 220 sends the response message to the communicating unit 205 (FIG. 4), and the communicating unit 205 sends the response message to the multicast address distribution requesting unit 204 (FIG. 4).

Given below is a sequence of operations performed in the routers 300 and the network 500 at the time when the terminal 200 participates in a particular terminal group that is specified as the multicast group by the multicast address distribution server 100 and the data delivery server 400. The operations by which the terminal 200$x$ participates in a multicast group can be seen as follows. Regarding the data transmission path for delivering identical multicast data from the data delivery server 400 to a plurality of terminals 200-1 to 200-$n$ belonging to a multicast group, the data transmission path is formed as a packet routing path described below. That is, the data transmission path is formed as a multicast packet routing path having a tree structure in which the data delivery server 400 is treated as the root node and the terminals 200-1 to 200-$n$ belonging to a multicast group are treated as the leaf nodes. The intermediate nodes other than the root node and the leaf nodes correspond to a plurality of routers in the network 500 that perform intermediate transfer of multicast packets from the data delivery server 400, which is positioned at the root node, using multicast routing. In the following explanation, such a tree structure is called a multicast tree.

The operations by which the terminal 200$x$ participates in a multicast group are equivalent to the operations by which the terminal 200$x$ joins the multicast tree as a new leaf node. In order to add the terminal 200$x$ as a new leaf node in the multicast tree, it is necessary to newly establish a routing path from the router positioned at a joining point in the multicast tree to the terminal 200$x$. Besides, in order to add the terminal 200$x$ as a new leaf node in the multicast tree, it is necessary to rewrite the routing table in the routing path from the router positioned at a joining point in the multicast tree to data delivery server 400. The rewriting of the routing table needs to reflect, in the routers positioned in the path from a joining point in the multicast tree to the root node, the change in the multicast routing attributed to the addition of a packet routing path to the terminal 200$x$.

As a result, a multicast packet is firstly transferred from the data delivery server 400 to the router positioned at the joining point via the existing multicast tree included in the data transmission paths from the data delivery server 400 to the terminals 200-1 to 200-$n$. Then, the multicast packet is transferred from the joining point to the terminal 200$x$ via the newly-added routing path.

Regarding the operation of adding a new routing path from the router positioned at the joining point of the multicast tree to the terminal 200$x$, it is possible to think of the following two cases. In the first case, the router to which the terminal 200$x$ is directly connected in a single hop (in the following explanation, called an end router) has not established a routing path connecting to the existing multicast tree and is not participating in the existing multicast tree. In this case, in order to make the end router to participate in the existing multicast tree, the following two operations need to be performed. Firstly, a routing path from the end router to the router positioned at the joining point of the existing multicast tree needs to be established using a multicast routing protocol such as the protocol independent multicast (PIM) or the multicast-OSPF (M-OSPF, where OSPF stands for Open-Shortest-Path-First). Then, the end router needs to additionally register, in the routing table thereof, the terminal 200x as one of the destinations for concurrent transmission of multicast packets that are received via the existing multicast tree. Regarding the operation by which the end router newly performs additional registration of the terminal 200x as one of the destinations for concurrent transmission of multicast packets, it is possible to use the IP group management protocol (IGMP), for example. In the second case, the end router has established a routing path connecting to the existing multicast tree and is participating in the existing multicast tree. In this case, it is sufficient if the end router uses the IGMP and newly performs additional registration, in the routing table thereof, of the terminal 200x as one of the destinations for concurrent transmission of multicast packets that are received from the existing multicast tree.

Figure 5:
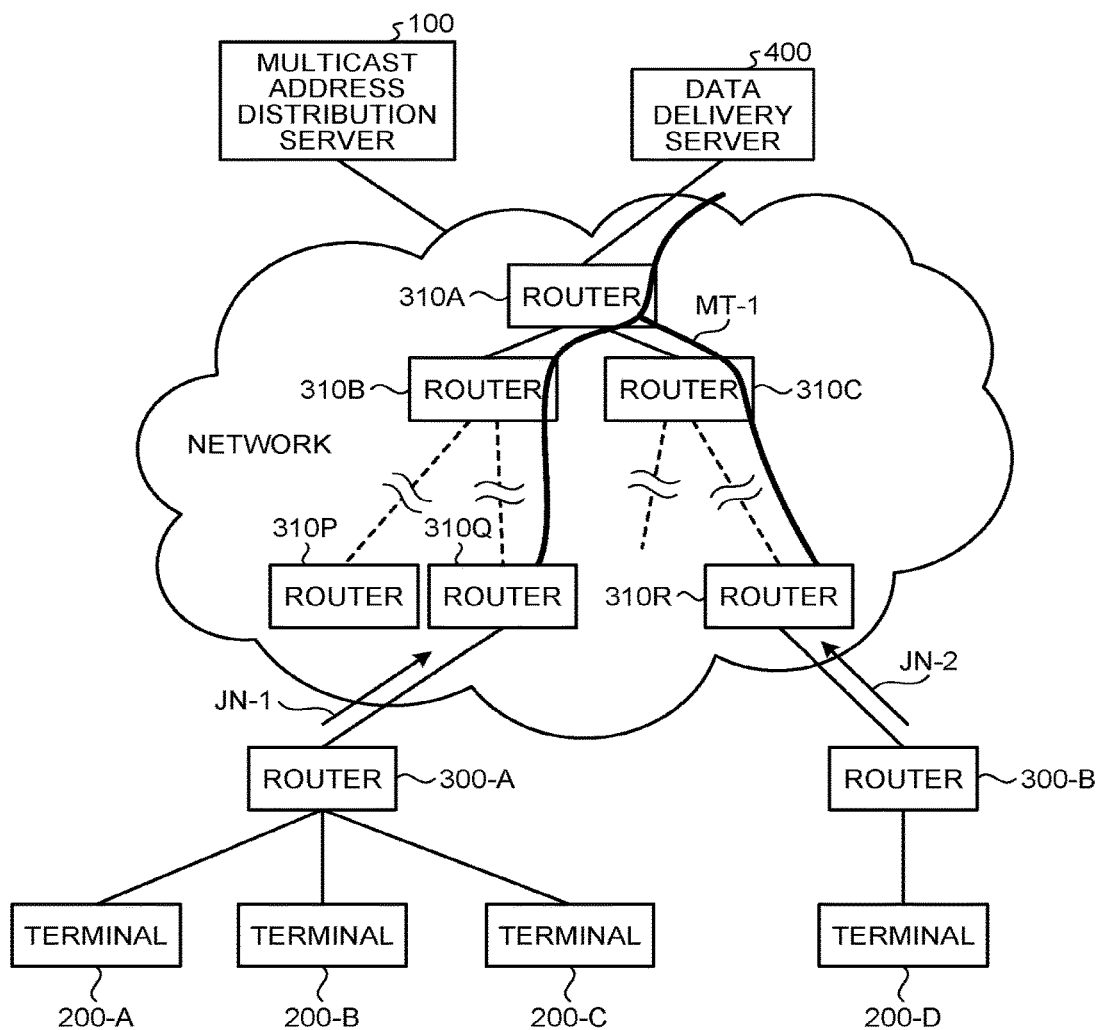
FIG. 5 is a diagram for explaining a sequence of operations by which the terminal participates in an existing multicast tree in a network.

Explained below with reference to FIG. 5 is a specific scenario for the operation of newly adding a routing path from the router positioned at a joining point in the multicast tree to the terminal 200x. In the specific example explained below with reference to FIG. 5, the explanation is given under the assumption that the PIM sparse mode (PIM stands for Protocol Independent Multicast) is used as the multicast routing protocol. However, the present embodiment can alternatively be implemented using a multicast routing protocol other than the PIM. In FIG. 5, the multicast routing path referred to as MT-1 represents a portion of the multicast tree from the data delivery server 400 to a plurality of terminals belonging to the terminal group identified by a multicast address MA1. In FIG. 5, it is illustrated that the multicast routing path MT-1 starts at the data delivery server 400 serving as the root node, and passes through a plurality of routers including a router 310Q and a router 310R in the network 500. Moreover, in FIG. 5, the router 300-A represents an end router to which the terminals 200-A to 200-C are directly connected in a single hop; and the router 300-B represents an end router to which the terminal 200-D is directly connected in a single hop. The routers 310Q and 310R represent joining points at the time when the routers 300-A and 300-B, which are the end routers, participate in the multicast tree MT-1 using the multicast routing protocol.

In the example illustrated in FIG. 5, the terminal 200-A, which is assigned with the multicast address MA1 by the multicast address distribution server 100, issues, to the router 300-A representing the end router for the terminal 200-A, a request indicating interest in newly participating in the terminal group identified by the multicast address MA1. The request can be issued from the terminal 200-A to the end router 300-A using the IGMP. Upon receiving the request, the end router 300-A determines whether the end router 300-A itself is already participating in the multicast tree MT-1. If the router 300-A is already participating, the end router 300-A performs new addition, in the routing table thereof, of the terminal 200-A as one of the destinations for concurrent transmission of multicast packets that are addressed to the multicast address MA1 via the multicast tree MT-1. Assume that, in the routing table in the end router 300-A, the terminals 200-B and 200-C are already registered as the destinations for concurrent transmission of multicast packets that are addressed to the multicast address MA1, and assume that the terminal 200-A is also newly registered as a destination for concurrent transmission of multicast packets.

In this case, the end router 300-A performs concurrent transmission of the packets, which are received via the multicast tree MT-1 and addressed to the multicast address MA1, to all of the terminals 200-A to 200-C.

Subsequently, the explanation is given about a case in which, when a request indicating interest in newly participating in the terminal group identified by the multicast address MA1 is issued by the terminal 200-A, the router 300-A representing an end router is yet to participate in the multicast tree MT-1. In this case, the end router 300-A performs the following sequence of operations using the multicast routing protocol (the PIM sparse mode). Firstly, the end router 300-A issues a join request JN-1 for participating in the multicast tree MT-1 to the router 310Q that represents a joining point in the network 500 for participating in the multicast tree MT-1. In response, the router 310Q in the network 500 performs new registration of the end router 300-A as one of the relay transfer destinations (one of the next hops) for the packets addressed to the multicast address MA1. As a result, a multicast packet that is received by the router 310Q via the multicast tree MT-1 is relay-transferred to the existing next-hop routers as well as to the end router 300-A.

In an identical manner, the explanation can be given about a case in which, when a request indicating interest in newly participating in the terminal group identified by the multicast address MA1 is issued by the terminal 200-D, the router 300-B representing an end router is yet to participate in the multicast tree MT-1. In this case, firstly, the end router 300-B issues a join request JN-2 for participating in the multicast tree MT-1 to the router 310R that represents a joining point in the network 500 for participating in the multicast tree MT-1. In response, the router 310R in the network 500 performs new registration of the end router 300-B as one of the relay transfer destinations (one of the next hops) for the packets addressed to the multicast address MA1. As a result, a multicast packet that is received by the router 310R via the multicast tree MT-1 is relay-transferred to the existing next-hop routers as well as to the end router 300-B.

After the router 300-A, which represents the end router for the terminal 200-A, has participated in the multicast tree MT-1; the end router 300-A performs the following operations. That is, the end router 300-A performs new registration, in the routing table thereof, of the terminal 200-A as one of the destinations for concurrent transmission of multicast packets that are addressed to the multicast address MA1 via the multicast tree MT-1. In an identical manner, after the router 300-B, which represents the end router for the terminal 200-D, has participated in the multicast tree MT-1; the end router 300-B performs the following operations. That is, the end router 300-B performs new registration, in the routing table thereof, of the terminal 200-B as one of the destinations for concurrent transmission of multicast packets that are addressed to the multicast address MA1 via the multicast tree MT-1.

Figure 6:
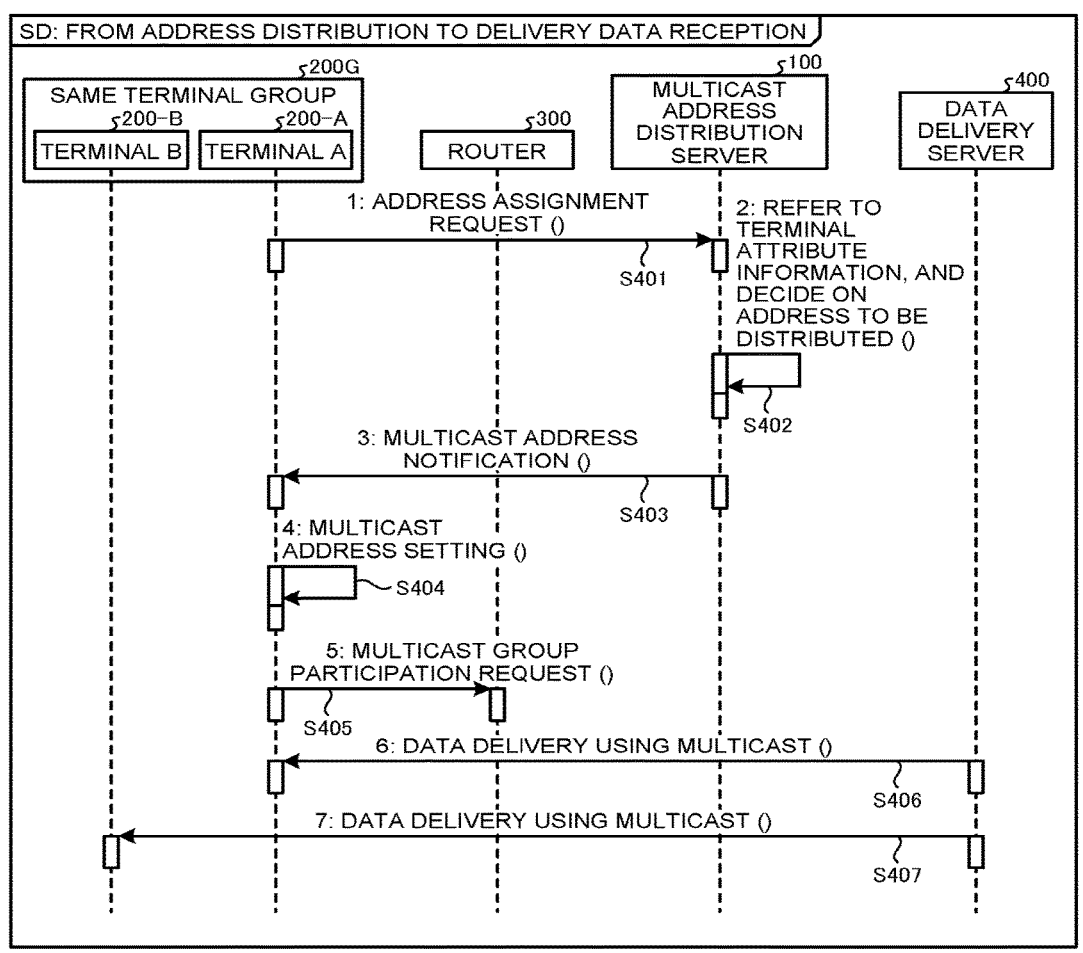
FIG. 6 is a sequence diagram for explaining a sequence of operations performed according to the embodiment with the aim of assigning a multicast address to the terminal and making the terminal to participate in a particular multicast group.

Explained below with reference to FIG. 6 is a sequence of operations performed according to the present embodiment with the aim of assigning a multicast address to the terminal 200 and making the terminal 200 to participate in a particular multicast group. In the exemplary scenario explained below, the terminal 200-B already belongs to a terminal group 200G, and the explanation is given for a sequence of operations by which the terminal 200-A attempts to newly participate in the terminal group 200G and receive the same multicast delivery data as received by the terminal 200-B. Firstly, the terminal 200-A that attempts to newly participate in the terminal group 200G sends, to the multicast address distribution server 100 via the router 300-A, a message that includes a multicast address assignment request (Step S401 illustrated in FIG. 6). The message including the assignment request also includes terminal attribute information about the current terminal attributes of the terminal 200-A.

Upon receiving the message including the assignment request, the multicast address distribution server 100 decides on the multicast address to be assigned to the terminal 200-A based on the terminal attribute information included in the message (Step S402 illustrated in FIG. 6). More particularly, in the multicast address distribution server 100, the following operations are performed. The multicast address distributing unit 101 (FIG. 3) instructs the multicast address managing unit 102 (FIG. 3) to obtain the relevant multicast address from the terminal attribute information that is included in the message received from the terminal 200-A. Upon receiving the instruction from the multicast address distributing unit 101, the multicast address managing unit 102 performs the following operations. That is, the multicast address managing unit 102 searches the table, which contains the correspondence relationship between the attribute information and the multicast addresses of the terminals 200, using the terminal attribute information, which is newly sent regarding the terminal 200-A by the multicast address distributing unit 101, as the search key. If the multicast address corresponding to the terminal attribute information of the terminal 200-A is obtained as a result of the search, then the multicast address managing unit 102 assigns a null address, which is equivalent to the unassigned portion of the concerned multicast address, to the terminal 200-A.

Meanwhile, if the multicast address managing unit 102 determines that the terminal attribute information received from the terminal 200-A does not match with any of the correspondence relationship between the attribute information and the multicast addresses held in the table, then the multicast address distributing unit 101 generates a new multicast group. Subsequently, the multicast address distributing unit 101 newly generates a multicast address corresponding to the newly-generated multicast group. Lastly, the multicast address distributing unit 101 decides on the newly-generated multicast address as the multicast address to be assigned to the terminal 200-A.

Then, in order to notify the terminal 200-A about the multicast address to be assigned to the terminal 200-A, the multicast address distribution server 100 sends a response message including the multicast address to the terminal 200-A (Step S403 illustrated in FIG. 6). Upon receiving the multicast address included in the response message, the terminal 200-A sets therein the received multicast address as the address for multicast reception (Step S404 illustrated in FIG. 6). Subsequently, in order to participate in the multicast group identified by the multicast address, the terminal 200-A sends a participation request to the router 300 (Step S405 illustrated in FIG. 6). The router 300 serving as the destination for the participation request is an end router capable of directly communicating with the terminal 200-A in a single hop, and the multicast group identified by the multicast address corresponds to the terminal group 200G. Upon receiving the participation request from the terminal 200-A, the end router 300 enables the terminal 200-A to participate in the multicast group according to the sequence of operations explained with reference to FIG. 5. As a result, the terminal 200-A gets added as a leaf node in the multicast tree corresponding to the concerned multicast group. In this way, once the terminal 200-A participates in the terminal group 200G identified by the multicast address, the terminal 200-A as well as the terminal 200-B can receive the same multicast delivery data (Steps S406 and S407 illustrated in FIG. 6).

Figure 7:
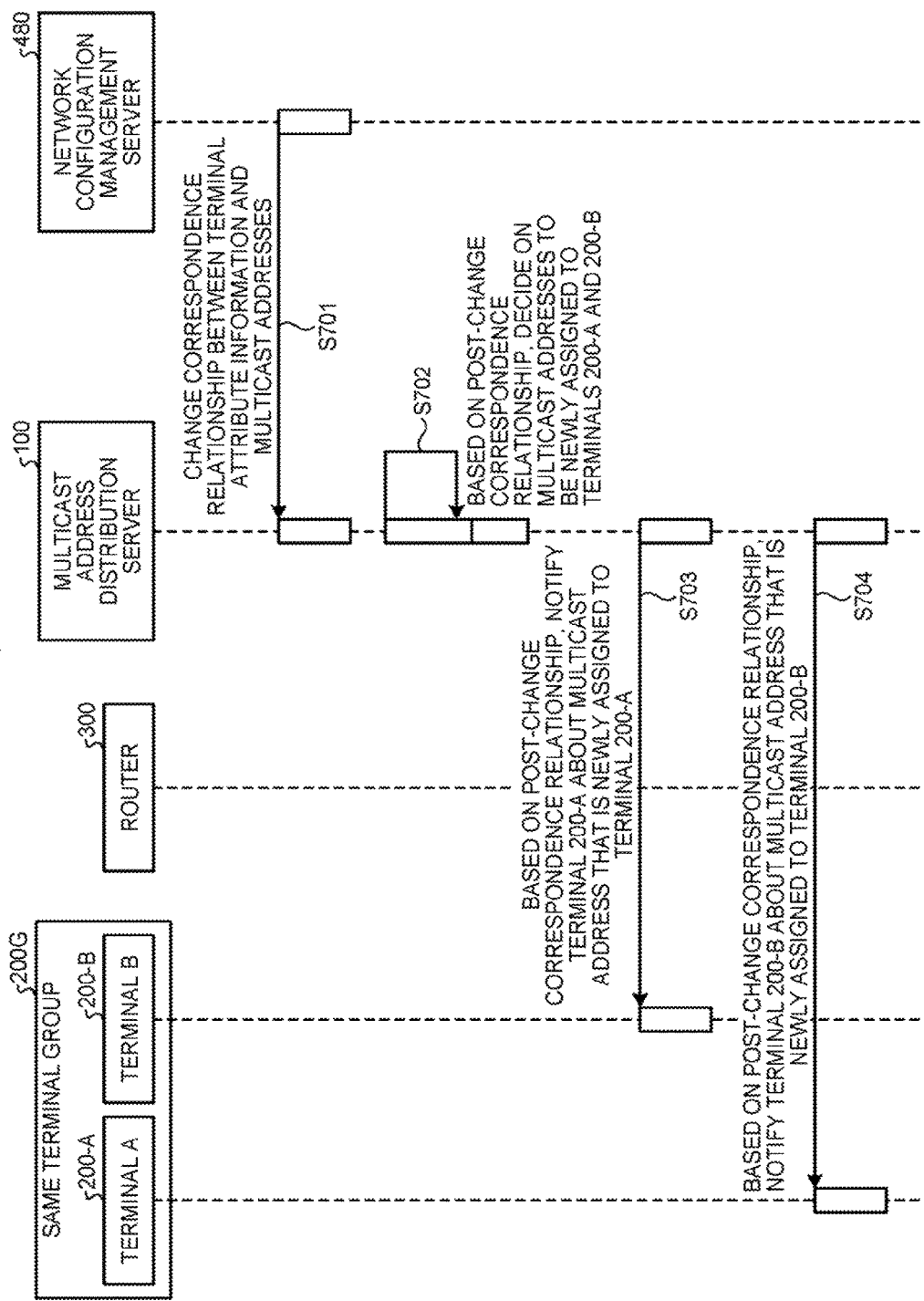
FIG. 7 is a sequence diagram for explaining a sequence of operations performed according to the embodiment by the multicast address distribution server for reassigning a different multicast address to the terminal.

Explained below with reference to FIG. 7 is a scenario for the case in which one or more sets of correspondence relationship between the terminal attribute information and the multicast addresses held in the table in the multicast address distribution server 100 is changed. In this case, the multicast address distribution server 100 needs to notify each terminal about the change. Hence, for example, an exemplary scenario illustrated in FIG. 7 plays out. Firstly, a network configuration management server 480, which is installed in the network 500 (FIG. 1), determines, according to the system operation management policy, whether it is necessary to change the correspondence relationship between the terminal attribute information and the multicast addresses. If the change is necessary, then the network configuration management server 480 notifies the multicast address distribution server 100 about the changed contents related to the correspondence relationship between the terminal attribute information and the multicast addresses (Step S701 illustrated in FIG. 7). In an alternative example, the determination of whether it is necessary to change the correspondence relationship between the terminal attribute information and the multicast addresses as well as the decision on the changed contents can be done in the multicast address distribution server 100 itself.

Then, based on the changed contents related to the correspondence relationship as notified from the network configuration management server 480, the multicast address distribution server 100 determines whether there would be any change in the multicast addresses to be assigned to the terminals 200-A and 200-B. If there would be any change in the multicast address to be assigned to the terminal 200-A; then, based on the changed contents, the multicast address distribution server 100 decides on the multicast address to be newly assigned to the terminal 200-A. If there would be any change in the multicast address to be assigned to the terminal 200-B; then, based on the changed contents, the multicast address distribution server 100 decides on the multicast address to be newly assigned to the terminal 200-B (Step S702 illustrated in FIG. 7).

Subsequently, the multicast address distribution server 100 notifies the terminal 200-A about the decided multicast address that is to be newly assigned to the terminal 200-A after the change in the correspondence relationship (Step S703 illustrated in FIG. 7). In an identical manner, the multicast address distribution server 100 notifies the terminal 200-B about the decided multicast address that is to be newly assigned to the terminal 200-B after the change in the correspondence relationship (Step S704 illustrated in FIG. 7).

Explained below with reference to FIG. 8 is a packet format of an assignment request message that is sent by the terminal 200$x$ to the multicast address distribution server 100 for requesting assignment of a multicast address. In FIG. 8, a field f11 includes a GET command of the HTTP protocol and a plurality of parameters associated with the GET command. Of the parameters, value1 represents a parameter in which the value of the terminal attribute information corresponding to a terminal attribute attr1_name is stored. Moreover, of the parameters, value2 represents a parameter in which the value of the terminal attribute information corresponding to a terminal attribute attr2_name is stored, and so on. In FIG. 8, a field f12 is used to store HTTP header information of the HTTP protocol. The packet format illustrated in FIG. 8 can include a plurality of pieces of terminal attribute information of the terminal 200$x$, which requests for assignment of a multicast address, as a plurality of parameters. Herein, the packet format illustrated in FIG. 8 can be transmitted as an HTTP request representing a multicast address assignment request issued from the terminal 200x to the multicast address distribution server 100 via the HTTP connection 92 illustrated in FIG. 2.

Explained below with reference to FIG. 9 is a packet format of a response message that is sent in response to the assignment request message and for notifying the terminal 200x about the multicast address assigned thereto by the multicast address distribution server 100. In FIG. 9, a field f21 includes an affirmative response (OK) command representing an HTTP response to the multicast address assignment request that was issued as an HTTP request. Moreover, in FIG. 9, a field f22 is used to store HTTP header information of the HTTP protocol. Furthermore, in FIG. 9, a field f23 includes one or more multicast addresses that are to be notified to the terminal 200x as the values of a plurality of parameters associated with the affirmative response (OK) command representing an HTTP response. In this way, the multicast address distribution server 100 can include two or more multicast addresses, which are to be concurrently assigned to the terminal 200x, in a single response message having the packet format illustrated in FIG. 9 and send the response message to the terminal 200x. As a result, the multicast address distribution server 100 can concurrently assign two or more multicast addresses to the terminal 200x. Meanwhile, the packet format illustrated in FIG. 9 can be transmitted as an HTTP response from the multicast address distribution server 100 to the terminal 200x for the purpose of notifying the terminal 200x about the multicast addresses to be assigned thereto.

Explained below with reference to FIG. 10 is a data structure of a table maintained and managed by the multicast address managing unit 102 in the multicast address distribution server 100. The table illustrated in FIG. 10 is an association table used in holding the correspondence relationship between the attribute information and the multicast addresses of the terminals 200. The first column in the table illustrated in FIG. 10 is used to store identification numbers of the terminal groups (the multicast groups) that are identified by individual multicast addresses. The second column in the table illustrated in FIG. 10 is used to store the values of terminal attribute information representing such terminal information which needs to be held by one or more terminals 200a to 200k belonging to the terminal groups identified by the respective identifiers written in the first column. The third column in the table illustrated in FIG. 10 is used to store values representing the multicast addresses that need to be assigned to one or more terminals 200b to 200j belonging to the terminal groups identified by the respective identifiers written in the first column.

For example, regarding the terminal 200h installed in the Kanagawa prefecture, the value of the terminal attribute information representing the geographical installation location of the terminal 200h is a value representing the Kanagawa prefecture. In this case, the terminal 200h should be belonging to the terminal group assigned with the identification number "1" at the topmost level of the first column in the table illustrated in FIG. 10. Hence, a multicast address "ff1e::1234:0:1", which is stored in the topmost level of the third column in the table illustrated in FIG. 10, represents the multicast address to be assigned to the terminal 200h.

Moreover, for example, regarding the terminal 200j having the firmware version 1.0.1, the value of the terminal attribute information representing the firmware version of the terminal 200j is "1.0.1". In this case, the terminal 200j should be belonging to the terminal group assigned with the identification number "3" at the third level of the first column in the table illustrated in FIG. 10. Hence, a multicast address "ff1e::1234:0:3", which is stored in the third level of the third column in the table illustrated in FIG. 10, represents the multicast address to be assigned to the terminal 200j.

When an instruction is received from the multicast address distributing unit 101, the multicast address managing unit 102 performs the following operations by referring to the table illustrated in FIG. 10. That is, the multicast address distributing unit 101 searches the table, which is illustrated in FIG. 10 and which contains the correspondence relationship between the attribute information and the multicast addresses of the terminals 200, using the attribute information, which is newly sent regarding the terminal 200x by the multicast address distributing unit 101, as the search key. If a multicast address corresponding to the search key is obtained as a result of the search, then the multicast address managing unit 102 assigns a null address, which is equivalent to the unassigned portion of the multicast address, to the terminal 200x. If the multicast address managing unit 102 determines that the terminal attribute information received from the terminal 200x does not match with any of the correspondence relationship between the attribute information and the multicast addresses held in the table illustrated in FIG. 10, then the multicast address distributing unit 101 generates a new multicast group. Subsequently, the multicast address distributing unit 101 newly generates a multicast address corresponding to the newly-generated multicast group. Lastly, the multicast address distributing unit 101 decides on the newly-generated multicast address as the multicast address to be assigned to the terminal 200x.

First Practical Example of Present Embodiment

Explained below with reference to FIGS. 11 and 12 is a first practical example of the present embodiment. In the first practical example, smart meters 600 are used as a practical example of the terminals 200 and have a measurement function for measuring the electricity usage within the respective installation areas as well as have a sensor function. In the first practical example, the terminal attribute information of the smart meters 600 enables identification of the geographical locations of installation of the smart meters 600. In the first practical example, for each installation area of the smart meter 600, the terminal group to which the smart meter 600 belongs is fixed; and the terminal group to which each smart meter 600 should belong is assigned to the smart meter 600. In this case, typically, if the installation area of a particular smart meter 600x is changed, then it is difficult to dynamically change the terminal group to which the particular smart meter 600x belongs. Moreover, when there is a change in the installation area of the smart meter 600x, the corresponding terminal attribute information is changed. At that time, typically, dynamically resetting a new multicast address to the smart meter 600x or dynamically changing the multicast group to which the smart meter 600x belongs cannot be done in a manner adapted to the change in the terminal attribute information. Explained below with reference to FIGS. 11 and 12 is an exemplary scenario for resolving the issues in the first practical example.

On the left side in FIG. 11, a section A (R10 illustrated in FIG. 11) as well as a section B (R20 illustrated in FIG. 11) represents a geographical area for installation of the smart meters 600. Moreover, in FIG. 11, the routers 300-A and 300-B function as end routers capable of directly communicating with one or more smart meters 600 in a single hop in the section A (R10 illustrated in FIG. 11) and the section B (R20 illustrated in FIG. 11), respectively. Furthermore, smart meters 600-A and 600-B that are connected under the end router 300-A form a terminal group N10; while a smart meter 600-C that is connected under the end router 300-B forms a terminal group N20. The smart meters 600-A and 600-B are assumed to be assigned with a multicast address MA-1 by a multicast address distribution server 110. Thus, the smart meters 600-A and 600-B receive terminal control instructions and terminal setting information delivered using multicast and addressed to the multicast address MA-1 from the data delivery server 400 via the end router 300-A and the network 500. The smart meter 600-C is assumed to be assigned with a multicast address MA-2 by the multicast address distribution server 110. Thus, the smart meter 600-C receives terminal control instructions and terminal setting information delivered using multicast and addressed to the multicast address MA-2 from the data delivery server 400 via the end router 300-B and the network 500. The multicast address MA-1 identifies the terminal group N10 as a multicast group; while the multicast address MA-2 identifies the terminal group N20 as a multicast group.

Herein, it is assumed that the multicast address MA-1 is assigned to the group of smart meters 600 installed only in the section A (R10 illustrated in FIG. 11). In this case, terminal control instructions and terminal setting information that are delivered to the group of smart meters 600 installed only in the section A are delivered using multicast to the multicast address MA-1 as the destination from the data delivery server 400. Similarly, it is assumed that the multicast address MA-2 is assigned to the group of smart meters 600 installed only in the section B (R20 illustrated in FIG. 11). In this case, terminal control instructions and terminal setting information that are delivered to the group of smart meters 600 installed only in the section B are delivered using multicast to the multicast address MA-2 as the destination from the data delivery server 400.

Assume that the installation area of the smart meter 600-A is changed from the section A (R10 illustrated in FIG. 11) to the section B (R20 illustrated in FIG. 11) (see right side in FIG. 11). As seen on the right side in FIG. 11, the smart meter 600-A is installed along with the smart meter 600-C in the section B (R20 illustrated in FIG. 11), and is connected along with the smart meter 600-C to the terminal group N20 under the end router 300-B. As described above, terminal control instructions and terminal setting information that are delivered to the group of smart meters 600 installed only in the section B are delivered using multicast to the multicast address MA-2 as the destination from the data delivery server 400. Thus, the multicast address to be assigned to the smart meter 600-A needs to be changed from the multicast address MA-1, which identifies the terminal group N10, to the multicast address MA-2, which identifies the terminal group N20.

Explained below with reference to FIG. 12 is a sequence of operations in which, accompanying the change in the installation area of the smart meter 600-A from the section A (R10 illustrated in FIG. 11) to the section B (R20 illustrated in FIG. 11), a new multicast address MA-2 is assigned to the smart meter 600-A. In an identical manner to FIG. 11, the smart meters 600-A and 600-B connected under the end router 300-A form the terminal group N10, while the smart meter 600-C connected under the end router 300-B forms the terminal group N20. Moreover, in an identical manner to FIG. 11, the smart meters 600-A and 600-B are assigned with the multicast address MA-1 by the multicast address distribution server 110. The smart meters 600-A and 600-B receive a terminal control instruction, which includes a notification about a change in the electricity charges of the section A (R10 illustrated in FIG. 11) and which is delivered using multicast from the data delivery server 400 to the multicast address MA-1 as the destination via the end router 300-A and the network 500 (Step S901 illustrated in FIG. 12). The smart meter 600-C is assigned with the multicast address MA-2 by the multicast address distribution server 110. The smart meter 600-C receives a terminal control instruction, which includes a notification about a change in the electricity charges of the section B (R20 illustrated in FIG. 11) and which is delivered using multicast from the data delivery server 400 to the multicast address MA-2 as the destination via the end router 300-B and the network 500 (Step S902 illustrated in FIG. 12). Herein, the multicast address MA-1 identifies the terminal group N10 as a multicast group; while the multicast address MA-2 identifies the terminal group N20 as a multicast group.

Of the terminal attribute information of the smart meter 600-A, when the terminal attribute information representing the geographical area for installation of the smart meter 600-A is changed, the smart meter 600-A performs the following operations in order to withdraw from the terminal group N10 representing the currently-belonging multicast group. That is, to the end router 300-A in the section A (R10 illustrated in FIG. 11) to which the smart meter 600-A belongs, the smart meter 600-A issues a withdrawal request for withdrawing from the multicast tree identified by the multicast address MA-1. As a result of issuing a withdrawal request for withdrawing from the concerned multicast group, the smart meter 600-A withdraws from the multicast group (the terminal group N10) in which the smart meter 600-A was participating before the change in the terminal attribute information (Step S903 illustrated in FIG. 12).

Subsequently, when a network administrator or a worker actually shifts the installation area of the smart meter 600-A from the section A to the section B, the smart meter 600-A detects the change in the installation area thereof (Step S904 illustrated in FIG. 12). Then, in order to request assignment of a new multicast address corresponding to the post-change installation area, the smart meter 600-A sends an assignment request message, which includes an assignment request for a new multicast address, to the multicast address distribution server 100 (Step S905 illustrated in FIG. 12). Upon receiving the assignment request message from the smart meter 600-A, the multicast address distribution server 110 decides on a new multicast address to be assigned to the smart meter 600-A (Step S906 illustrated in FIG. 12).

In order to decide on the multicast address, the multicast address distribution server 110 firstly searches the table illustrated in FIG. 10 using the terminal attribute information, which enables identification of the current installation area of the smart meter 600-A, as the search key. Then, the multicast address distribution server 110 extracts, from the table, the multicast address corresponding to the terminal attribute information. In the example illustrated in FIG. 10, the section A (R10 illustrated in FIG. 11), which represents the installation area of the smart meter 600-A prior to the change in the installation area, corresponds to "Kanagawa prefecture" as the value of the terminal attribute information stored in the first level of the second column in the table illustrated in FIG. 10. Moreover, in the example illustrated in FIG. 10, the section B (R20 illustrated in FIG. 11), which represents the installation area of the smart meter 600-A after the change in the installation area, corresponds to "Osaka prefecture" as the value of the terminal attribute information stored in the second level of the second column in the table illustrated in FIG. 10. Moreover, after the change in the installation area of the smart meter 600-A, a multicast address "ff1e::1234:0:2" stored in the second level of the third column in the table illustrated in FIG. 10 represents the multicast address corresponding to the terminal attribute information "Osaka prefecture" of the smart meter 600-A. The multicast address "ff1e::1234:0:2" corresponds to the multicast address MA-2 that should be assigned to the smart meter 600-A after the change in the installation area. Since the installation area of the smart meter 600-A has changed from the section A to the section B, the multicast address distribution server 100 decides that the multicast address MA-2 should be newly assigned to the smart meter 600-A.

Subsequently, in order to notify the smart meter 600-A about the multicast address decided at Step S906, the multicast address distribution server 110 sends a response message including the decided multicast address to the smart meter 600-A (Step S907 illustrated in FIG. 12). Upon being notified about the multicast address MA-2 that is decided by the multicast address distribution server 110, the smart meter 600-A sets therein the multicast address MA-2 as the address for multicast delivery reception (Step S908 illustrated in FIG. 12). Then, the smart meter 600-A determines that the terminal group N20 (FIG. 11) represents the multicast group identified by the multicast address MA-2 set therein, and that there is a need to participate in the terminal group N20 under the end router 300-B. Hence, in order to participate in the terminal group N20 under the end router 300-B, the smart meter 600-A issues a participation request to the end router 300-B for participating in the multicast tree corresponding to the terminal group N20 (Step S909 illustrated in FIG. 12).

Once the smart meter 600-A participates in the multicast tree corresponding to the terminal group N20 under the end router 300-B, only the smart meter 600-B becomes able to receive a terminal control instruction that is delivered using multicast to the multicast address MA-1 as the destination from the data delivery server 400 and that notifies a change in the electricity charges of the section A (Step S910 illustrated in FIG. 12). On the other hand, the smart meters 600-A and 600-C become able to receive a terminal control instruction that is delivered using multicast to the multicast address MA-2 as the destination from the data delivery server 400 and that notifies a change in the electricity charges of the section B (Steps S911 and S912 illustrated in FIG. 12).

Second Practical Example of Present Embodiment

Figure 13:
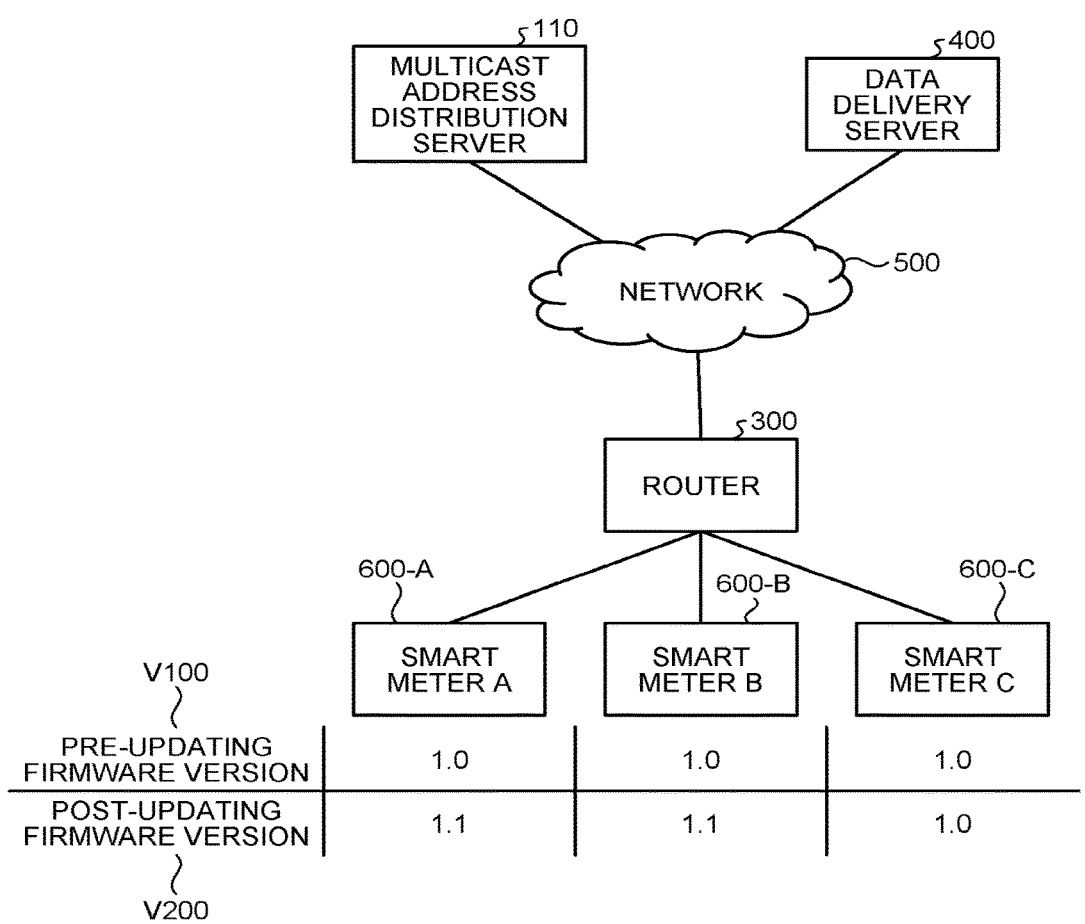
FIG. 13 is a system configuration diagram for explaining a sequence of operations performed according to the embodiment in the case in which the firmware version of a smart meter is changed.
Figure 14:
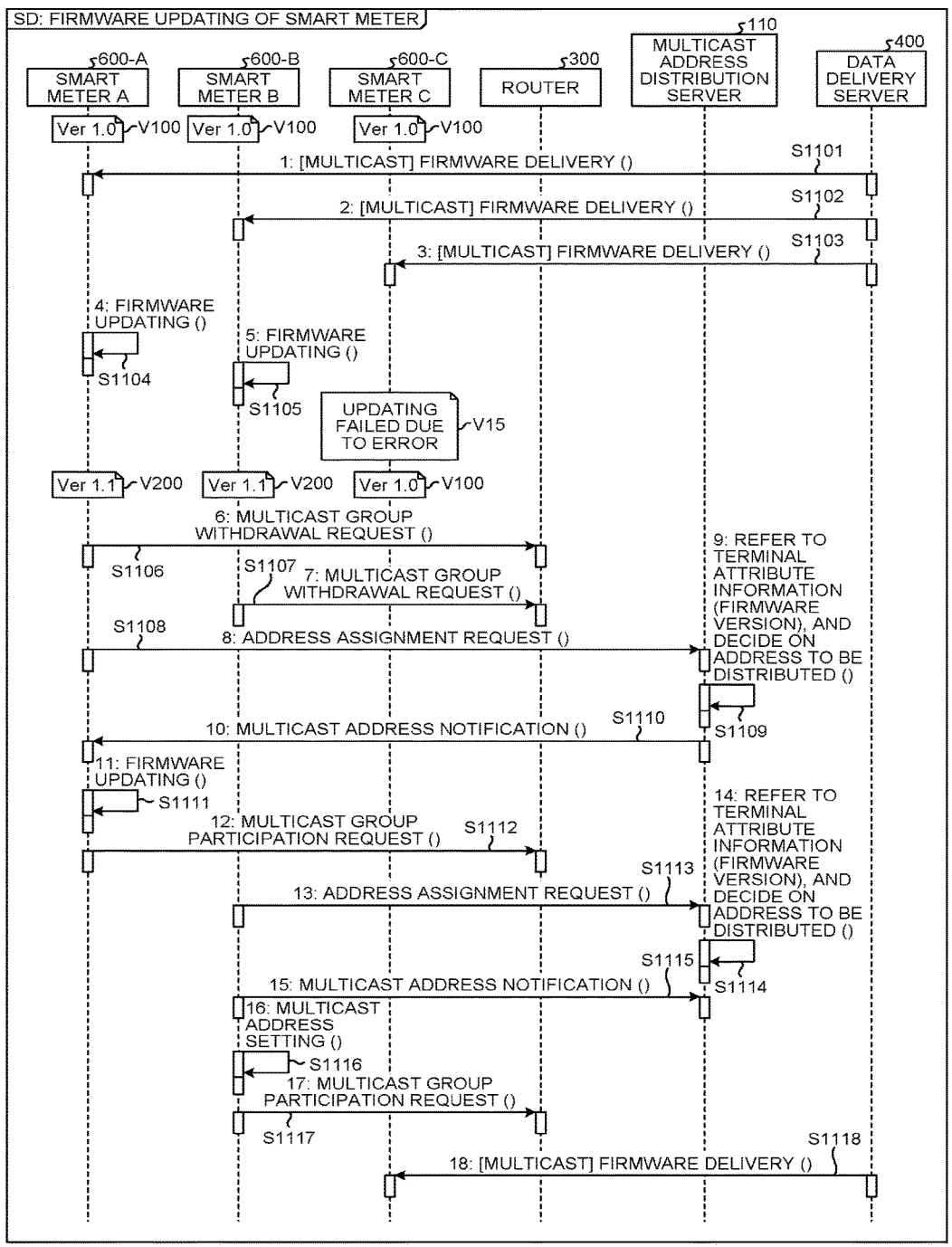
FIG. 14 is a sequence diagram for explaining a sequence of operations performed according to the embodiment in the case in which the firmware version of a smart meter is changed.

Explained below with reference to FIGS. 13 and 14 is a second practical example of the present embodiment. In the second practical example too, the smart meters 600 are used as a practical example of the terminals 200 and have a measurement function for measuring the electricity usage within the respective installation areas as well as have a sensor function. In the second practical example, the terminal attribute information of the smart meters 600 enables identification of the version of the firmware installed in the smart meters 600. In the second practical example, for each version of the firmware installed in the smart meters 600, the terminal group to which the smart meters 600 belong is fixed; and each smart meter 600 is assigned with the terminal group to which it should belong. In such a case, typically, if the firmware version of a particular smart meter 600x is changed, then it is difficult to dynamically change the terminal group to which the particular smart meter 600x belongs. Moreover, when there is a change in the firmware version of the smart meter 600x, the corresponding terminal attribute information is changed. At that time, typically, dynamically resetting a new multicast address to the smart meter 600x or dynamically changing the multicast group to which the smart meter 600x belongs cannot be done in a manner adapted to the change in the terminal attribute information. Explained below with reference to FIGS. 13 and 14 is an exemplary scenario for resolving the issues in the second practical example.

In FIG. 13, the router 300 is an end router capable of directly communicating with three smart meters 600-A to 600-C in a single hop. Thus, it is assumed that the three smart meters 600-A to 600-C receive terminal control instructions and terminal setting information delivered using multicast from the data delivery server 400 via the router 300 and the network 500. In FIG. 13, V100 represents the pre-updating firmware version of the firmware in the smart meters 600-A to 600-C; V200 represents the post-updating firmware version of the firmware. In the exemplary scenario explained below, it is assumed that the smart meters 600 having the pre-updating old firmware version receive, from the data delivery server 400, delivery data from the multicast tree identified by the multicast address MA-1. Moreover, in the exemplary scenario explained below, it is assumed that the smart meters 600 having the post-updating new firmware version receive, from the data delivery server 400, delivery data from the multicast tree identified by the multicast address MA-2.

Prior to the updating of the firmware, all of the smart meters 600-A to 600-C have the firmware version 1.0 and receive terminal control instructions and terminal setting information delivered using multicast to the multicast address MA-1 as the destination from the data delivery server 400. In FIG. 13, it is illustrated that the firmware version of the smart meter 600-B is updated from 1.0 to 1.1. After the updating is done, the firmware version of the smart meters 600-A and 600-B get updated to 1.1. However, in the smart meter 600-C, it is assumed that the firmware updating is not successful, and the firmware version thereof remains to be 1.0. Thus, after the updating is done, the smart meters 600-A and 600-B receive terminal control instructions and terminal setting information delivered using multicast to the multicast address MA-2 as the destination from the data delivery server 400, while the smart meter 600-C continues to receive terminal control instructions and terminal setting information delivered using multicast to the multicast address MA-1 as the destination from the data delivery server 400.

Regarding the updating of the firmware version of the smart meters 600; for example, the network administrator or a worker can directly and manually perform the updating with respect to the smart meters 600. Alternatively, the updating of the firmware version can be performed by the smart meters 600 by downloading the new version from the data delivery server 400 via the network 500 and the router 300. As a result of the version updating operation, the following change needs to be made accompanying the change in the firmware version of the smart meters 600 as illustrated in FIG. 13. That is, the smart meters 600-A and 600-B that were receiving delivery information from the multicast tree corresponding to the multicast address MA-1 now need to receive delivery information from the multicast tree corresponding to the multicast address MA-2.

Explained below with reference to FIG. 14 is a sequence of operations in which, accompanying the change in the firmware version of the smart meters 600, a new multicast address MA-2 is assigned to the smart meters 600-A and 600-B. Firstly, in order to update the firmware version of the smart meters 600-A to 600-C, the data delivery server 400 delivers, using multicast, new firmware having the new version "1.1" to the smart meters 600-A to 600-C. Herein, the firmware having the new version is delivered, with the multicast address MA-1 as the destination, from the data delivery server 400 to the smart meters 600-A to 600-C via the multicast tree corresponding to the multicast address MA-1 (Steps S1101 to S1103 illustrated in FIG. 14). Once the firmware having the new version is delivered to the smart meters 600-A to 600-C, the smart meters 600-A and 600-B update the firmware version thereof to the new version "1.1" (Steps S1104 and S1105 illustrated in FIG. 14). However, because of a failure in the firmware updating in the smart meter 600-C, the firmware version remains to be the old version "1.0" in the smart meter 600-C (V15 illustrated in FIG. 14).

As a result of updating the firmware version as described above, the following change needs to be made accompanying the change in the firmware version of the smart meters 600-A and 600-B. That is, the smart meters 600-A and 600-B that were receiving delivery information from the multicast tree corresponding to the multicast address MA-1 now need to receive delivery information from the multicast tree corresponding to the multicast address MA-2. For that, firstly, the smart meters 600-A and 600-B need to withdraw from the multicast tree corresponding to the multicast address MA-1. Thus, the smart meters 600-A and 600-B issue a withdrawal request to the end router 300 for withdrawing from the multicast tree corresponding to the multicast address MA-1 (Steps S1106 and S1107 illustrated in FIG. 14).

Then, in order to request assignment of the new multicast address MA-2 that corresponds to the post-updating firmware version, the smart meter 600-A sends an assignment request message, which includes a request for assigning a new multicast address, to the multicast address distribution server 110 (Step S1108 illustrated in FIG. 14). Upon receiving the assignment request message from the smart meter 600-A, the multicast address distribution server 110 decides on a new multicast address to be assigned to the smart meter 600-A (Step S1109 illustrated in FIG. 14). In order to decide on the multicast address, the multicast address distribution server 110 firstly searches the table illustrated in FIG. 10 using the terminal attribute information, which enables identification of the current firmware version of the smart meter 600-A, as the search key. Then, the multicast address distribution server 110 extracts, from the table, the multicast address corresponding to the terminal attribute information. Since the firmware version of the smart meter 600-A has been updated from the old version "1.0" to the new version "1.1", the multicast address distribution server 110 decides that the multicast address MA-2 should be newly assigned to the smart meter 600-A.

Then, in order to notify the smart meter 600-A about the multicast address MA-2 decided at Step S1109, the multicast address distribution server 100 sends a response message including the multicast address MA-2 to the smart meter 600-A (Step S1110 illustrated in FIG. 14). Upon receiving the multicast address MA-2 from the multicast address distribution server 110, the smart meter 600-A sets therein the received multicast address MA-2 as the address for multicast delivery reception (Step S1111 illustrated in FIG. 14). Subsequently, in order to participate in the multicast tree identified by the multicast address MA-2, the smart meter 600-A sends a participation request to the end router 300 for participating in the new multicast tree corresponding to the multicast address MA-2 (Step S1112 illustrated in FIG. 14).

Subsequently, in order to request assignment of the new multicast address MA-2 that corresponds to the post-updating firmware version, the smart meter 600-B sends an assignment request message, which includes a request for assigning a new multicast address, to the multicast address distribution server 110 (Step S1113 illustrated in FIG. 14). Upon receiving the assignment request message from the smart meter 600-B, the multicast address distribution server 110 decides on a new multicast address to be assigned to the smart meter 600-B (Step S1114 illustrated in FIG. 14). In order to decide on the multicast address, the multicast address distribution server 110 firstly searches the table illustrated in FIG. 10 using the terminal attribute information, which enables identification of the current firmware version of the smart meter 600-B, as the search key. Then, the multicast address distribution server 110 extracts, from the table, the multicast address corresponding to the terminal attribute information. Since the firmware version of the smart meter 600-B has been updated from the old version "1.0" to the new version "1.1", the multicast address distribution server 110 decides that the multicast address MA-2 should be newly assigned to the smart meter 600-B. In the example illustrated in FIG. 10, the old version "1.0" and the new version "1.1" of the firmware are stored as the terminal attribute information in the third level and the fourth level, respectively, of the second column in the table illustrated in FIG. 10. In the example illustrated in FIG. 10, the multicast address MA-2, which should be assigned to the smart meters 600-A to 600-B after the updating of the firmware version, corresponds to a multicast address "ff1e::1234::0:4" stored in the fourth level of the third column in the table illustrated in FIG. 10.

Subsequently, in order to notify the smart meter 600-B about the multicast address MA-2 decided at Step S1114, the multicast address distribution server 100 sends a response message including the multicast address MA-2 to the smart meter 600-B (Step S1115 illustrated in FIG. 14). Upon receiving the multicast address MA-2 from the multicast address distribution server 110, the smart meter 600-B sets therein the received multicast address MA-2 as the address for multicast delivery reception (Step S1116 illustrated in FIG. 14). Subsequently, in order to participate in the multicast tree identified by the multicast address MA-2, the smart meter 600-B sends a participation request to the end router 300 for participating in the new multicast tree corresponding to the multicast address MA-2 (Step S1117 illustrated in FIG. 14).

Then, in order to reattempt updating of the firmware version of the smart meter 600-C in which the firmware updating had failed, the data delivery server 400 delivers new firmware having the new version "1.1" to the smart meter 600-C. The firmware of the new version is delivered, with the multicast address MA-1 as the destination, from the data delivery server 400 to the smart meter 600-C via the multicast tree corresponding to the multicast address MA-1 (Step S1118 illustrated in FIG. 14).

Other Practical Examples

As the terminal attribute information of the terminal 200, it is also possible to use the owner of the terminal 200. When a change in the owner of the terminal 200 is detected, in order to request assignment of the multicast address corresponding to the post-change owner, the terminal 200 can send a request message to the multicast address distribution server 100 for requesting assignment of a new multicast address. For example, the terminal 200 can send, to the multicast address distribution server 100, the assignment request message in which the name of the owner of the terminal 200 is included in the form of character string data as the terminal attribute information. In response, the terminal 200 can get a notification about the multicast address corresponding to the post-change owner from the multicast address distribution server 100.

Effect of Present Embodiment

The present embodiment can provide the terminal 200 and the multicast address distribution server 100 that are capable of dynamically changing the multicast group to which the terminal 200 belongs in a manner adapted to the change in the attribute information, when the attribute information of the terminal 200 is changed. Thus, according to the present embodiment, it becomes possible to solve the issues in the conventional technology in which dynamically resetting a new multicast address in the terminal or dynamically changing the multicast group to which the terminal belongs cannot be done in a manner adapted to the change in the attribute information.

In the first practical example of the present embodiment, the attribute information of the terminal 200 contains installation area information about the geographical area of installation of the terminal 200. When a change in the geographical area of installation of the terminal 200 is detected, a second assignment request is reissued to the multicast address distribution server 100 for again requesting assignment of a multicast address. Thus, in the first practical example of the present embodiment, when there is a change in the installation area of a particular terminal 200x, the terminal group to which the particular terminal 200x belongs can be changed in a dynamic manner. Moreover, when there is change in the installation area of the terminal 200x, the corresponding terminal attribute information is also changed. At that time, according to the present embodiment, dynamically resetting a new multicast address in the terminal 200x or dynamically changing the multicast group to which the terminal 200x belongs can be done in a manner adapted to the change in the terminal attribute information.

In the second practical example of the present embodiment, the attribute information of the terminal 200 represents the version of the firmware of the terminal 200; and, when a change in the version of the firmware due to updating is detected, a second assignment request is reissued to the multicast address distribution server 100 for requesting assignment of a multicast address. Thus, in the second practical example of the present embodiment, when the firmware version of a particular terminal 200x is changed, the terminal group to which the particular terminal 200x belongs can be changed in a dynamic manner. Moreover, when there is change in the firmware version of the terminal 200x, the corresponding terminal attribute information is also changed. At that time, according to the present embodiment, dynamically resetting a new multicast address in the terminal 200x or dynamically changing the multicast group to which the terminal 200x belongs can be done in a manner adapted to the change in the terminal attribute information.

Aspects of the present invention are as follows.

(Aspect 1) A terminal including:

a unit configured to send, to a multicast address distribution server, an assignment request including attribute information of the terminal, so as to request assignment of a multicast address enabling identification of a terminal group; and a unit configured to set, in response to the assignment of the multicast address, the multicast address in the terminal and make the terminal to participate in the terminal group corresponding to the multicast address, wherein when a change in the attribute information is detected, the terminal reissues a second assignment request including the attribute information after change, so as to request the multicast address distribution server for a new multicast address and change terminal group for participation according to change in the attribute information.

(Aspect 2) The terminal according to Aspect 1, wherein the attribute information of the terminal contains installation area information about geographical area of installation of the terminal, and when a change in the geographical area of installation of the terminal is detected, the terminal reissues the second assignment request for again requesting the multicast address distribution server to assign a multicast address.

(Aspect 3) The terminal according to Aspect 1, wherein the attribute information of the terminal represents version of firmware of the terminal, and when a change in the version is detected attributed to updating of the firmware, the terminal reissues the second assignment request for again requesting the multicast address distribution server to assign a multicast address.

(Aspect 4) The terminal according to Aspect 1, wherein the attribute information of the terminal represents owner of the terminal, and when a change in the owner of the terminal is detected, the terminal reissues the second assignment request for again requesting the multicast address distribution server to assign a multicast address.

(Aspect 5) The terminal according to Aspect 1, wherein, when the attribute information of the terminal is changed, prior to reissuing the second assignment request for again requesting assignment of a multicast address, the terminal issues a multicast group withdrawal request to an end router to which the terminal belongs, and withdraws from the terminal group in which the terminal belonged before the attribute information is changed.

(Aspect 6) A multicast address distribution server including:

a unit configured to receive an assignment request from a terminal for requesting assignment of a multicast address;

a unit configured to hold correspondence relationship between attribute information of the terminal and a multicast address;

a unit configured to decide, based on the attribute information of the terminal as received from the terminal, a multicast address to be distributed to the terminal; and a unit configured to notify the terminal about the decided multicast address.

(Aspect 7) The multicast address distribution server according to Aspect 6, wherein a notification of the multicast address from the multicast address distribution server includes a plurality of multicast addresses.

(Aspect 8) The multicast address distribution server according to Aspect 6, wherein terminal attribute information is extracted from an assignment request that is issued by the terminal for requesting assignment of a multicast address, and when the extracted terminal attribute information matches with none of the correspondence relationship between attribute information and multicast addresses as held in the multicast address distribution server, a multicast group is newly created.

(Aspect 9) The multicast address distribution server according to Aspect 6, wherein, when one or more sets of the correspondence relationship between attribute information and multicast addresses as held in the multicast address distribution server is changed, a notification about change is sent to each terminal.

(Aspect 10) A non-transitory computer-readable medium including a terminal control program that includes a sequence of instruction codes executable by a CPU in a terminal for controlling the terminal, the terminal control program causing the CPU to perform:

sending, to a multicast address distribution server, an assignment request including attribute information of the terminal so as to request assignment of a multicast address enabling identification of a terminal group;

setting, in response to the assignment of the multicast address, the multicast address in the terminal and making the terminal to participate in the terminal group corresponding to the multicast address; and reissuing, when a change in the attribute information of the terminal is detected, a second assignment request including the attribute information after change, so as to request the multicast address distribution server for a new multicast address and change terminal group for participation according to change in the attribute information.

(Aspect 11) A non-transitory computer-readable medium including a server control program that includes a sequence of instruction codes executable by a CPU in a server for controlling the server, the server control program causing the CPU to perform:

receiving an assignment request from a terminal for requesting assignment of a multicast address;

holding correspondence relationship between attribute information of the terminal and a multicast address;

deciding, based on the attribute information of the terminal as received from the terminal, a multicast address to be distributed to the terminal; and notifying the terminal about the decided multicast address.

(Aspect 12) A multicast group changing method for changing a multicast group in which a terminal participates, the multicast group changing method comprising:

sending, to a multicast address distribution server, an assignment request including attribute information of the terminal, so as to request assignment of a multicast address enabling identification of a terminal group;

setting, in response to the assignment of the multicast address, the multicast address in the terminal and making the terminal to participate in the terminal group corresponding to the multicast address; and reissuing, when a change in the attribute information of the terminal is detected, a second assignment request including the attribute information after change, so as to request the multicast address distribution server for a new multicast address and change terminal group for participation according to change in the attribute information.

(Aspect 13) A multicast address distributing method comprising:

receiving an assignment request from a terminal for requesting assignment of a multicast address;

holding correspondence relationship between attribute information of the terminal and a multicast address;

deciding, based on the attribute information of the terminal as received from the terminal, a multicast address to be distributed to the terminal; and notifying the terminal about the decided multicast address.

In the present invention, when attribute information of the terminal is changed, the multicast group to which the terminal belongs can be dynamically changed in a manner adapted to the change in the attribute information.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A terminal comprising:
processing circuitry configured to
send, to a multicast address distribution server, an assignment request including attribute information of the terminal, so as to request assignment of a multicast address enabling identification of a terminal group; and
set, in response to the assignment of the multicast address, the multicast address in the terminal and make the terminal to participate in the terminal group corresponding to the multicast address, wherein
when a change in the attribute information is detected, the terminal reissues a second assignment request including the attribute information after the change, so as to request the multicast address distribution server for a new multicast address and change a terminal group for participation according to change in the attribute information, wherein
the attribute information of the terminal contains installation area information about geographical area of a fixed installation of the terminal, and
when a change in the geographical area of fixed installation of the terminal is detected, the terminal reissues the second assignment request.

2. The terminal according to claim 1, wherein
the attribute information of the terminal represents version of firmware of the terminal, and
when a change in the version is detected attributed to updating of the firmware, the terminal reissues the second assignment request for again requesting the multicast address distribution server to assign a multicast address.

3. The terminal according to claim 1, wherein
the attribute information of the terminal represents owner of the terminal, and
when a change in the owner of the terminal is detected, the terminal reissues the second assignment request for again requesting the multicast address distribution server to assign a multicast address.

4. The terminal according to claim 1, wherein, when the attribute information of the terminal is changed, prior to reissuing the second assignment request for again requesting assignment of a multicast address, the terminal issues a multicast group withdrawal request to an end router to which the terminal belongs, and withdraws from the terminal group in which the terminal belonged before the attribute information is changed.

5. A multicast address distribution server comprising:
processing circuitry configured to
receive an assignment request from a terminal for requesting assignment of a multicast address;
hold correspondence relationship between attribute information of the terminal and a multicast address;
decide, based on the attribute information of the terminal as received from the terminal, a multicast address to be distributed to the terminal;
notify the terminal about the decided multicast address; and
when a change in the attribute information of the terminal is detected at the terminal, receive a second assignment request including the attribute information after the change, and assign a new multicast address to the terminal according to the change in the attribute information,
wherein
the attribute information of the terminal contains installation area information about geographical area of a fixed installation of the terminal, and
when a change in the geographical area of fixed installation of the terminal is detected, the processing circuitry receives the second assignment request.

6. A multicast group changing method for changing a multicast group in which a terminal participates, the multicast group changing method comprising:
sending, to a multicast address distribution server, an assignment request including attribute information of the terminal, so as to request assignment of a multicast address enabling identification of a terminal group;
setting, in response to the assignment of the multicast address, the multicast address in the terminal and making the terminal to participate in the terminal group corresponding to the multicast address; and
reissuing, when a change in the attribute information of the terminal is detected, a second assignment request including the attribute information after the change, so as to request the multicast address distribution server for a new multicast address and change a terminal group for participation according to change in the attribute information,
wherein
the attribute information of the terminal contains installation area information about geographical area of a fixed installation of the terminal, and
when a change in the geographical area of fixed installation of the terminal is detected, the terminal performs the reissuing of the second assignment request.

7. The terminal according to claim 1, wherein the attribute information of the terminal further includes version of firmware of the terminal or information of an owner of the terminal.

* * * * *